United States Patent
Huang et al.

(10) Patent No.: US 10,728,856 B2
(45) Date of Patent: Jul. 28, 2020

(54) METHODS AND ARRANGEMENTS FOR WAKE-UP RADIO OPERATIONS

(71) Applicant: INTEL IP CORPORATION, Santa Clara, CA (US)

(72) Inventors: Po-Kai Huang, San Jose, CA (US); Noam Ginsburg, Portland, OR (US); Daniel F. Bravo, Portland, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/145,847

(22) Filed: Sep. 28, 2018

(65) Prior Publication Data
US 2019/0045451 A1    Feb. 7, 2019

Related U.S. Application Data

(60) Provisional application No. 62/566,061, filed on Sep. 29, 2017.

(51) Int. Cl.
*H04W 52/02*    (2009.01)
*H04L 5/00*    (2006.01)

(52) U.S. Cl.
CPC ....... *H04W 52/0274* (2013.01); *H04L 5/0053* (2013.01); *H04L 5/0007* (2013.01); *H04L 5/0055* (2013.01)

(58) Field of Classification Search
CPC .................................................. G06F 1/3203
See application file for complete search history.

(56) References Cited

U.S. PATENT DOCUMENTS 10,334,447 B2 *    6/2019    Vajapeyam ........... H04W 16/14
2013/0170420 A1 *    7/2013    Kobayashi ........ H04W 52/0245
370/311

* cited by examiner

*Primary Examiner* — Chandrahas B Patel

(57) ABSTRACT

Logic may implement protocols and procedures to suspend a wake-up radio mode. Logic may enter a wake-up radio (WUR) mode suspend with a WUR request indicative of the WUR mode suspend. Logic may enter the WUR mode suspend from a WUR mode with a one-way handshake and may exit from the WUR mode to the WUR mode suspend. Logic may negotiate WUR mode parameters without entering the WUR mode. Logic may default to a WUR mode or a WUR mode suspend in response to receipt of a wake-up packet. Logic may receive the WUR request frame with a WUR mode suspend field to request entry into a WUR mode suspend. Furthermore, logic may maintain negotiated WUR mode parameters during the WUR mode suspend.

30 Claims, 11 Drawing Sheets

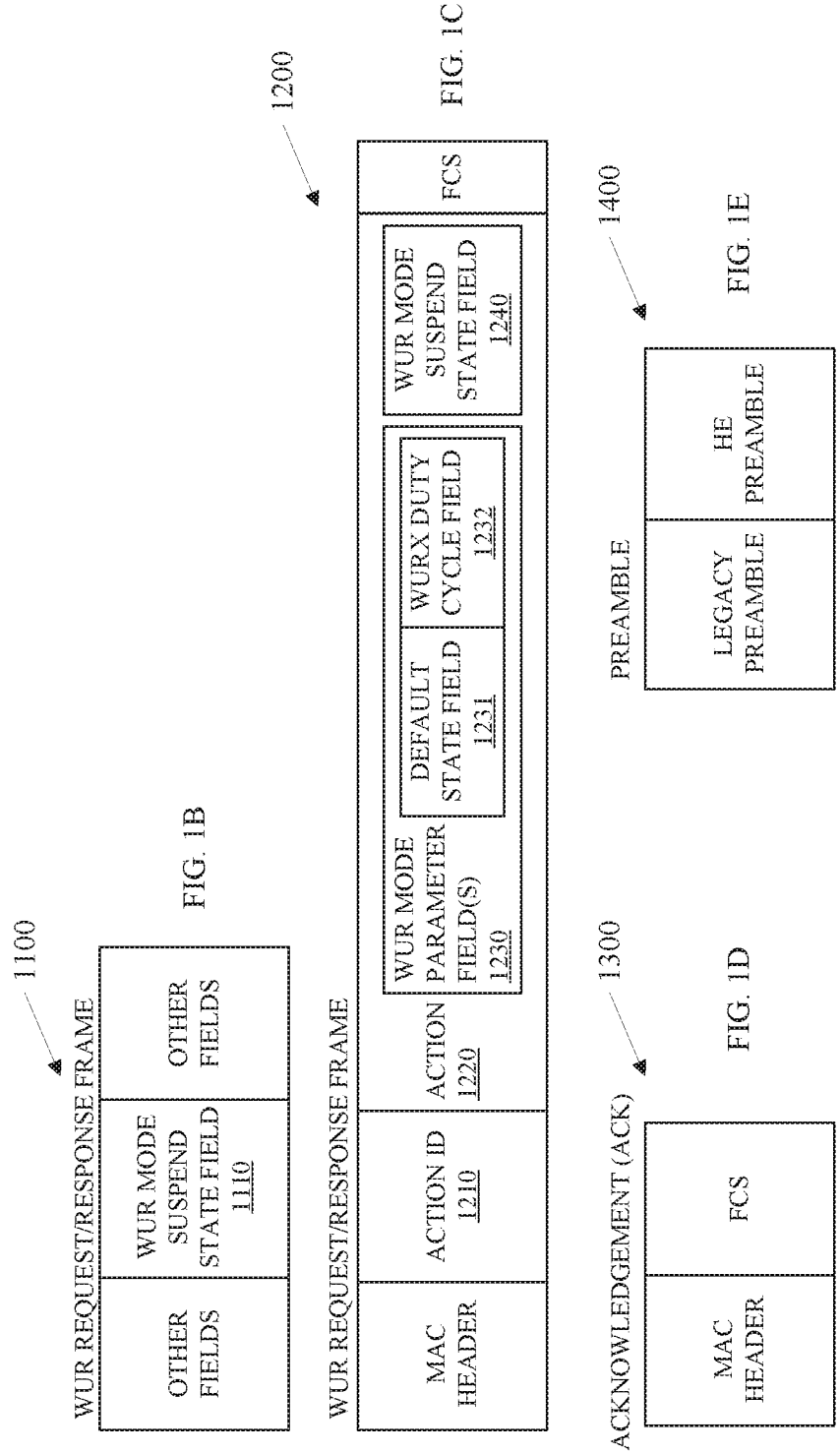

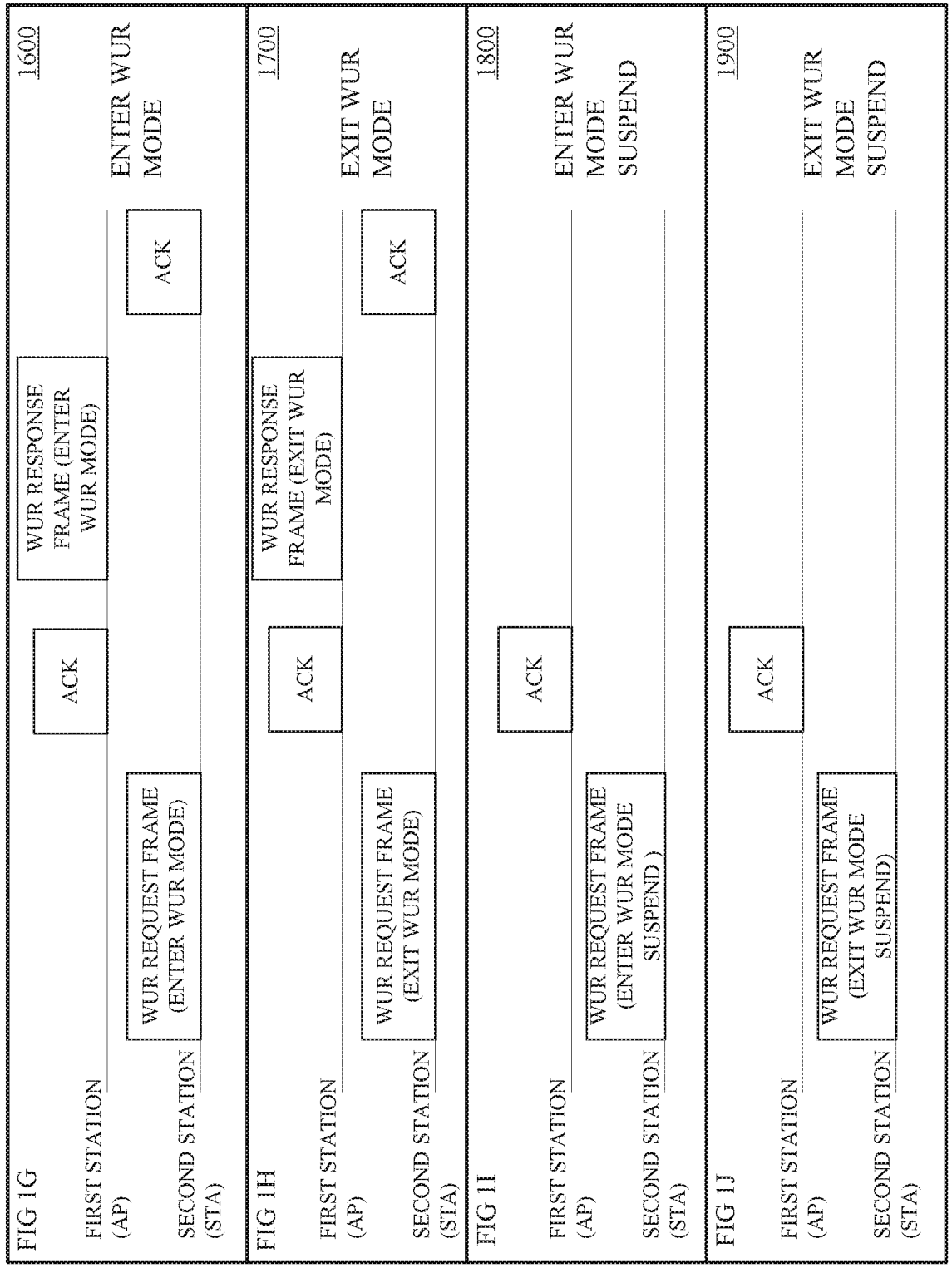

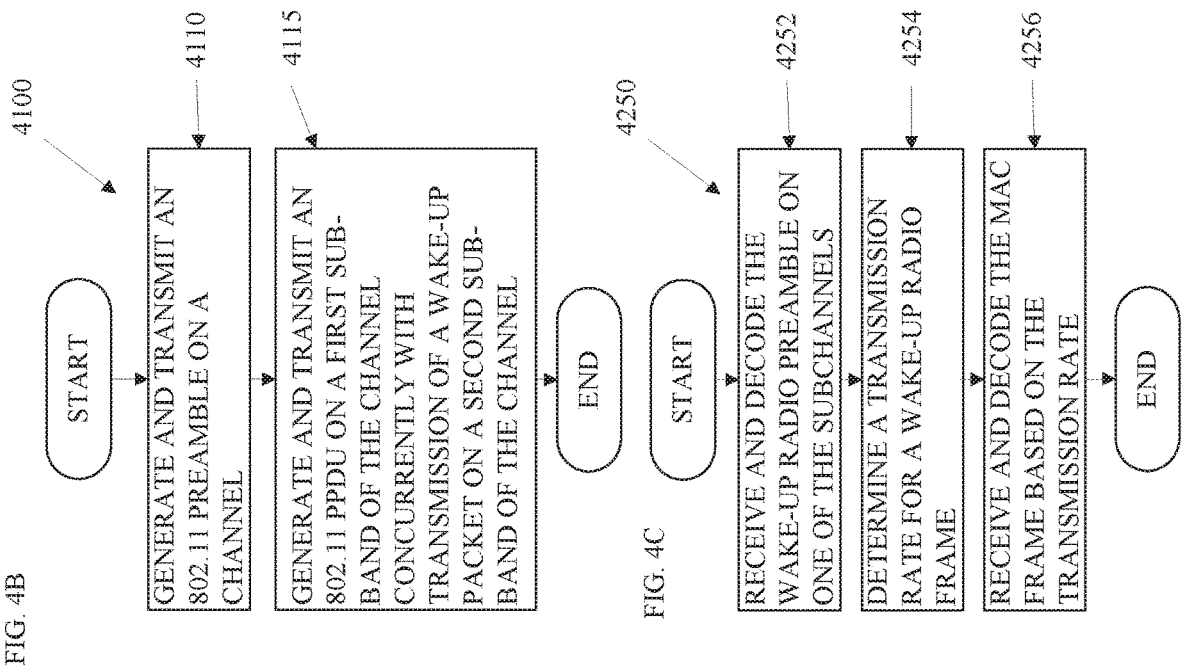
FIG. 4B
FIG. 4C
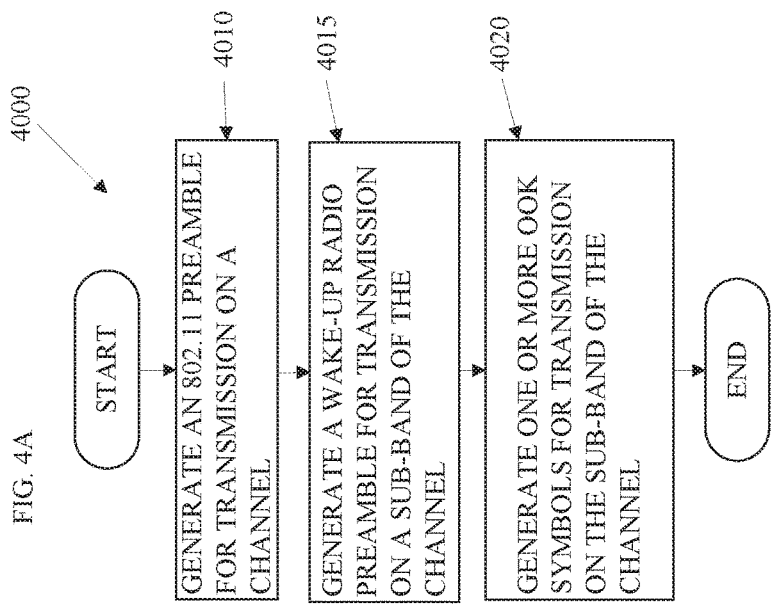
FIG. 4A

METHODS AND ARRANGEMENTS FOR WAKE-UP RADIO OPERATIONS

CROSS REFERENCE TO RELATED APPLICATIONS

This application also claims priority under 35 USC § 119 from U.S. Provisional Application No. 62/566,061, entitled "Methods and Arrangements for Wake-Up Radio Operations", filed on Sep. 29, 2017, the subject matter of which is incorporated herein by reference.

TECHNICAL FIELD

Embodiments are in the field of wireless communications. More particularly, embodiments may implement protocols and procedures to suspend a wake-up radio mode.

BACKGROUND

The increase in interest in network and Internet connectivity and Internet of Things (IoT) drives design and production of new wireless products. Low power consumption is a design factor to facilitate greater usage of wireless devices such as mobile devices and wearable devices. Wireless communication interfaces can consume significant amounts of power so product designs strike a balance between connectivity and power consumption. Thus, a design goal is to lower the power consumption by the wireless communication interfaces to facilitate increased connectivity in terms of distance, speed, and duration of wireless communications.

BRIEF DESCRIPTION OF THE DRAWINGS

FIGS. 1B-E depict embodiments of a wake-up radio (WUR) request/response frame format, another WUR request/response frame format, an acknowledgement frame format, and a physical layer preamble for WUR operations;

FIGS. 1F-K depict embodiments of a WUR power state diagram, a WUR negotiation state diagram, and timelines of negotiations for entering and exiting states;

FIGS. 4A-C depict embodiments of flowcharts to generate and transmit a wake-up radio frame, to generate and transmit a wake-up radio frame concurrently with another physical layer protocol data unit, and to receive and decode a wake-up radio frame.

DETAILED DESCRIPTION OF EMBODIMENTS

Figure 1A:
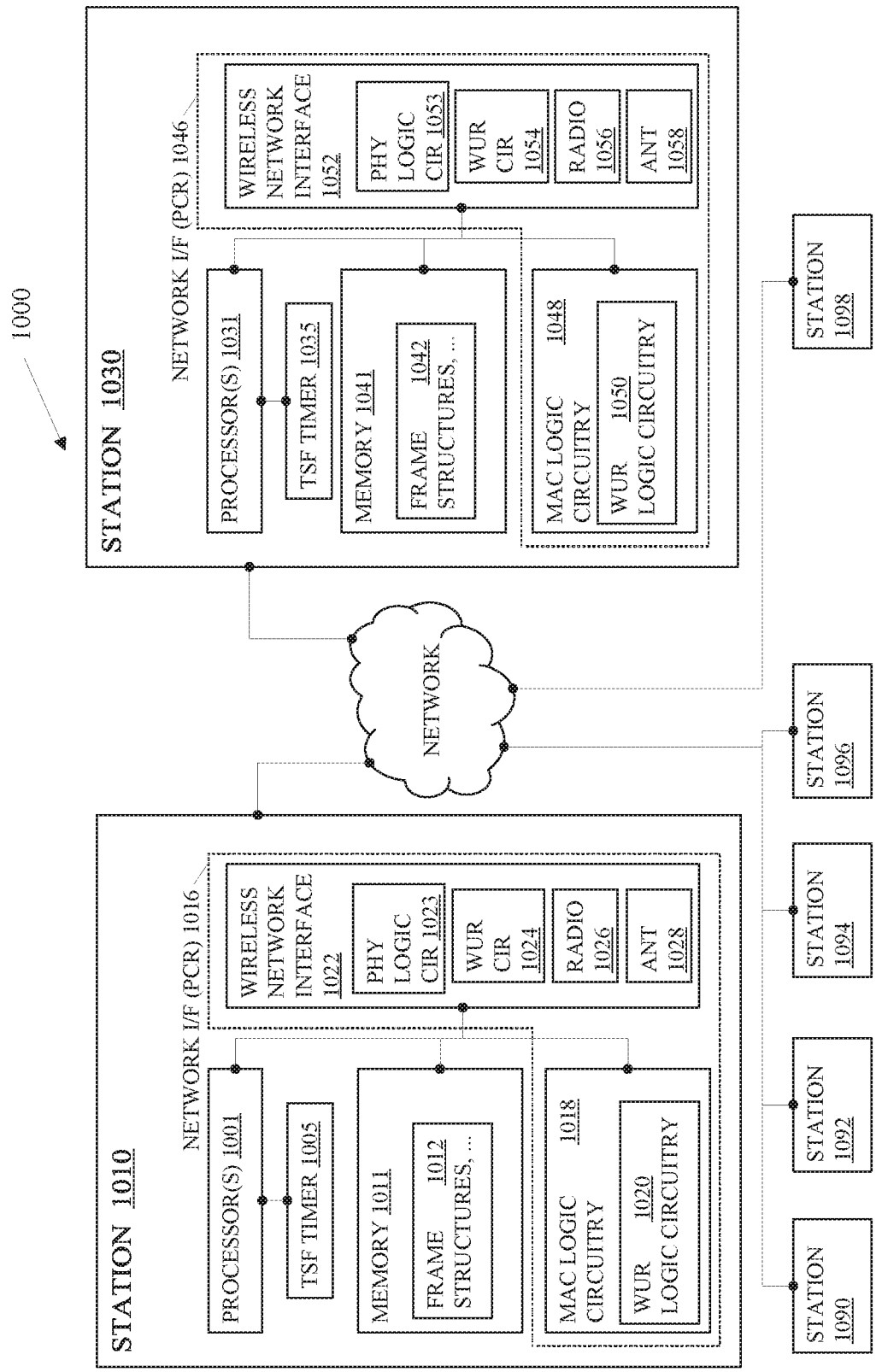
FIG. 1A depicts an embodiment of a wireless network to support wake-up radio operations.

The following is a detailed description of embodiments depicted in the drawings. The detailed description covers all modifications, equivalents, and alternatives falling within the appended claims.

Embodiments may reduce power consumption in wireless communication interfaces by using a low-power wake-up receiver (LP-WURx or WURx) in conjunction with a main Wi-Fi radio, referred to as a primary connectivity radio (PCR) or a main connectivity radio in a station. The WURx remains active in a wake-up radio (WUR) mode while the PCR enters a power save state or sleep state to reduce power consumption. When communication with the PCR is requested or needed, a station such as a peer station or an access point (AP) may transmit a WUR physical layer protocol data unit (PPDU) with a wake-up packet (WUP) to instruct the WURx to wake the PCR.

Some embodiments may transmit the WUP signal with an amplitude-shift keying (ASK) modulation such as On-Off Keying (OOK) to achieve a low cost, low power solution. The use of OOK modulation significantly simplifies the hardware involved with the WUR and increases the sensitivity of the wireless communications interface (aka wireless network interface). Furthermore, many embodiments utilize current physical layer (PHY) configurations by implementing the OOK signal with an orthogonal frequency division multiplexing symbols.

Some embodiments may leave the WURx powered on (in an active state) continuously. Further embodiments employ cycling of the WURx while in the WUR mode and the PCR is in a power save mode to further reduce power consumption. For instance, one embodiment may turn on the WURx every second with, e.g., a 50% duty cycle, to reduce power consumption with a slight increase in nominal latency. Another embodiment may turn on the WURx every fourth cycle (25% duty cycle) or turn off the WURx every fourth cycle (75% duty cycle).

Many embodiments include a WUR mode suspend in addition to a WUR mode and a non-WUR mode. The non-WUR mode is a state in which a station has not negotiated WUR mode parameters with an access point or a peer station. The WUR mode describes a state of a negotiation in which the station negotiated WUR mode parameters with the access point or the peer station and enables WUR operation. The WUR mode suspend is a state of negotiation in which a station suspends the WUR operation and maintains negotiated WUR mode parameters in memory with the access point or peer station as well as the station. A WUR operation is an operation in which the WURx is available, including a duty cycle agreement in many embodiments, while the PCR is in a doze state and the negotiated service period of the PCR, if applicable, is suspended.

The WUR mode suspend allows a WURx of a station to temporarily suspend the WUR mode while retaining parameters negotiated for the WUR mode with an access point or peer device. For instance, the station and the access point may negotiate WUR mode parameters, such as for the duty cycle, that describe the negotiated state of the WURx of the station while the station remains in WUR mode and the PCR of the station is in a power save state. If the station were to exit the WUR mode into the non-WUR mode, the negotiated parameters are no longer valid and the station will negotiate the parameters again for the WUR mode prior to entry into the WUR mode. In many embodiments, the station and the access point (or peer device) may maintain the parameters negotiated for the WUR mode in memory.

Upon entry into WUR mode suspend, both the station and the access point may, advantageously, maintain the parameters negotiated between the station and the access point for the WUR mode, allowing the station to re-enter the WUR mode without having to negotiate the parameters again with the access point. For instance, prior to entry into the WUR mode, the station may negotiate duty cycle parameters with the access point to agree upon an amount of time that the WURx of the station will remain active while in the WUR mode. In such embodiments, the duty cycle is re-established by the station upon entry into by the PCR into a doze state, without renegotiation of the duty cycle parameters. Furthermore, if the parameters for the WUR mode are negotiated during, e.g., association of the station with the access point, the station is in WUR mode and the PCR of the station enter a doze state with a one-way handshake via, e.g., transmission of a request frame and receipt of an acknowledgement from the access point or peer station. If the parameters are not negotiated prior to transmission of a request frame to enter the WUR mode, entry into the WUR mode may require a two-way hand shake in which the station transmits a request frame with WUR mode parameters, the station receives an acknowledgement in response from the access point or peer station, the access point or peer station transmits a response to the PCR of the station with the negotiated parameters, and the access point or peer station receives an acknowledgement in response from the PCR of the station.

In several embodiments, during the WUR mode, while the PCR is in a doze state, a service established between the access point and the station is suspended. The service may comprise, for instance, periodic data updates from, e.g., a web site. When the station enters the WUR mode suspend, the service established between the access point and the station is not suspended so the service resumes.

Note that a WUR PPDU is a wide bandwidth OFDMA packet such as a 20 MHz bandwidth packet, a 40 MHz bandwidth packet, an 80 MHz bandwidth packet, or the like with multiple resources units (RUs) for transmission of narrow bandwidth or narrower bandwidth frames on sub-channels of the WUR PPDU transmission. The WUR PPDU includes one or more preambles that are the bandwidth of the WUR PPDU such as a legacy preamble in a 20 MHz bandwidth WUR PPDU. A WUR frame, which may also be referred to as a WUR packet, is a 4 MHz bandwidth frame for transmission on a subchannel of the WUR PPDU transmission and one example of a WUR frame is a WUP. A WUR preamble is a preamble with a 4 MHz bandwidth within the WUR frame to sync with a WURx. The WUP, which can also be referred to as a wake-up frame, is a 4 MHz bandwidth frame for transmission on a subchannel of the WUR PPDU transmission that may have a minimal frame construction to instruct a WUR of a receiving station to wake a primary connectivity radio (PCR) of the station.

A WURx and a wake-up radio transmitter are generally referred to as wake-up radios (WURs). The WURs may comprise standalone circuitry or may comprise circuitry that utilizes one or more portions of the PCR. The WURx may provide a low-power solution (e.g., ~100 µW in active state) for, e.g., very low latency Wi-Fi or Bluetooth connectivity of wearable, Internet of Things (IoT), devices and other emerging devices that will be densely deployed and used in the near future.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. The embodiments are not limited to these standards.

To achieve the target of very low power consumption WUR, embodiments implement waveforms and techniques that allow extremely simple and low cost, low power hardware solutions. This is departure from previous versions of the Wi-Fi standard. One embodiment includes hardware that uses an inexpensive, very low power radio frequency (RF) section with a minimal baseband solution. Some embodiments include a WURx and no corresponding wake-up transmitter. Some embodiments include a wake-up transmitter and no corresponding WURx. Some embodiments include both a wake-up transmitter and a corresponding WURx. Other embodiments implement techniques that are more complicated requiring more hardware/cost and power. Different embodiments may provide preferable performance in different deployments or in different scenarios at various price points and power consumption levels.

Embodiments may facilitate transmission of the WUR frame in an Institute of Electrical and Electronics Engineers (IEEE) 802.11 multi-user, orthogonal frequency-division multiple access (OFDMA) packet format such as an IEEE 802.11ax OFDMA packet format. In some embodiments, the WUR may transmit a WUR PPDU with one or more WUR frames without transmitting packets in other sub-bands of the channel. An example is a physical layer (PHY) device that generates signals to transmit the WUR frame at the center of the band in a multi-user OFDMA transmission that multiplexes IEEE 802.11 transmissions in frequency within the same multi-user OFDMA packet. In other words, the PHY generates signals to transmit multiple different packets on different resource units or frequency sub-bands within the channel simultaneously. In other embodiments, the PHY device may generate signals to transmit the WUR frame at a sub-band that is not at the center of the band of the communication channel.

One embodiment may have only one data rate for transmission of WUR frame to meet the requirements of a WUR with very simple reduced hardware complexity with low cost. Other embodiments may enable two or more data rates for WUR frame transmissions.

Embodiments may increase spatial reuse (SR) of Wi-Fi communications with multiple different bandwidths at different frequency bands. Many embodiments focus on bands between 1 Gigahertz (GHz) and 6 GHz. Some embodiments focus on bandwidths such as 20 Megahertz (MHz), 40 MHz, 80 MHz, 160 MHz, and 80+80 MHz, while other embodiments focus on other bandwidths in the same or other frequency bands. However, the embodiments are not limited to the bandwidths and frequency bands described herein.

Various embodiments may be designed to address different technical problems associated with entering and exiting the WUR mode; negotiating and re-negotiating parameters associated with the WUR mode; generating, by a logic circuitry of a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend; generating, by a logic circuitry of an access point, an acknowledgement, in response to a request frame from a primary connectivity radio (PCR) of a station, to switch the station from a WUR mode to a WUR mode suspend, the request frame comprising a field with a value to indicate an entry, by the station, into a WUR mode suspend, the access point to maintain WUR mode parameters during the WUR mode suspend; and/or the like.

Different technical problems such as those discussed above may be addressed by one or more different embodiments. Embodiments may address one or more of these problems associated with entering and exiting the WUR mode. For instance, some embodiments that address problems associated with generating, by a logic circuitry of a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend; causing, by a physical layer device, transmission of the request frame; the physical layer device to communicate an acknowledgment received from the access point in response to transmitting the request frame; generating, by the logic circuitry, a second request frame with a second value to indicate an entry, by the first device into the WUR mode; the physical layer device to communicate an acknowledgment received from the access point in response to transmitting the second request frame; generating, by the logic circuitry, WUR mode parameters in response to a response frame from the access point; suspending, during the WUR mode, the existing negotiated service period between the access point and the first device for the PCR; resuming, during the WUR mode suspend, the existing negotiated service period between the access point and the first device for the PCR; establishing, by the logic circuitry, a duty cycle with the access point for the WUR circuitry while the first device is in the WUR mode; during the WUR mode, while the PCR is in a doze state, the WURx comprises a WURx awake state and a WURx power save state, the first device able to receive a WUR packet in the WURx awake state and not able to receive a WUR packet in the WURx power save state; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a system 1000 to transmit or receive a WUR packet as well as to generate, transmit, receive, decode, and interpret simultaneous transmissions between an access point (AP) and multiple stations (STAs) associated with the AP. The plurality of communications devices comprises STAs 1010 and 1030, and STAs 1090, 1092, 1094, 1096, and 1098. The STA 1010 may be wired and wirelessly connected to each of the STAs 1030, 1090, 1092, 1094, 1096, and 1098 and may comprise an access point (AP) or a peer device.

Each STA 1030, 1090, 1092, 1094, 1096, and 1098 may associate with the STA 1010. After associating with the STA 1010, each STA 1030, 1090, 1092, 1094, 1096, and 1098 may receive a channel sounding packet for beamforming their respective primary connectivity radios (PCRs) such as the PCR 1046 of the STA 1030. In many embodiments, the channel sounding packet may comprise a physical layer PHY null data packet (NDP). For instance, the channel sounding packet may include a very high throughput (VHT) NDP or a high efficiency (HE) NDP. In some embodiments, the medium access control (MAC) logic circuitry may control the timing of transmission of the channel sounding packet.

In the present embodiment, the STA 1010 comprises a WUR transmitter. The WUR transmitter may comprise WUR logic circuitry 1020 integrated with the MAC logic circuitry 1018 and WUR circuitry 1024 integrated with the wireless network interface (I/F) 1022. The WUR transmitter may comprise a distinct wireless interface from the PCR 1016 of the STA 1010 or may implement portions of the PCR 1016 as part of the WUR transmitter. In other embodiments, such as embodiments of peer stations that are battery-operated, mobile devices, the devices such as STA 1010 may comprise both a WUR transmitter and a WURx.

In the present embodiment, the STA 1030 comprises a WURx. The WURx may comprise WUR logic circuitry 1050 integrated with the MAC logic circuitry 1048 and WUR circuitry 1054 integrated with the wireless network interface (I/F) 1052. The WURx may comprise a distinct wireless interface from the PCR 1046 of the STA 1030 or may implement portions of the PCR 1046 as part of the WURx. In other embodiments, such as embodiments of stations that are battery-operated, mobile devices, the devices such as STA 1030 may comprise both a WUR transmitter and a WURx.

For WUR compatible STAs (also referred to as WUR STAs) such as the STA 1030, the STA 1010 can implement the WUR operation (or functionality) to allow the STA 1030 to enter a WUR mode in which the PCR 1046 of the STA 1030 is in a low power consumption state such as a sleep state or a doze state and in which the PCR 1046 of the STA 1030 is unavailable to receive communications. Advantageously, while the STA 1030 is in the WUR mode, the STA 1010 can wake the PCR 1046 of the STA 1030 by transmitting a WUP to the STA 1030 that is addressed to the WURx of the STA 1030, broadcast to a group of WURx's including the WURx of the STA 1030, or broadcast generally to all STAs. In response to receipt of the WUP, the STA 1030 may wake the PCR 1046 so the PCR can communicate with the STA 1010.

The WURx of the STA 1030 may be integrated with the PCR 1046 or may comprise distinct circuitry. The PCR 1046 is a main radio for communication by the STA 1030, or at least one of the main radios, that can associate with a basic service set (BSS) via, e.g., an AP such as the STA 1010, or a peer device such as a personal basic service set (PBSS) control point (PCP). The PCR 1046 can negotiate WUR mode parameters for the WURx of the STA 1030 to describe the state of the WURx while in WUR mode. For instance, the PCR 1046 may negotiate a duty cycle for the WURx while in WUR mode that cycles the WURx between an active state and an inactive state while the PCR 1046 of the STA 1030 is in a doze state.

In the WUR mode, the PCR 146 may enter a sleep mode to save power and the WURx of the STA 1030 can awake the PCR 1046 in response to receipt of a WUP from, e.g., the STA 1010 to perform a scheduled service or an unscheduled service associated with the PCR 1046. For instance, the STA 1010 may manage a BSS and may negotiate a service period with the PCR 1046 to periodically transmit data packets such as voice data packets to the PCR 1046 every 10 microseconds. The data packets may include the voice packets in a frame body of the data frame. FIG. 2F illustrates an example of a frame 2400 that can be a data frame, with a frame body 2434 that can include a voice packet.

During the WUR mode, while the PCR 1046 is in a doze state, the service negotiated between the STA 1010 and the PCR 1046 is suspended. In other words, the STA 1010 maintains parameters about the negotiated service period with the PCR 1046 and the STA 1030 maintains parameters about the negotiated service period but neither the STA 1010 nor the PCR 1046 are required to adhere to the negotiated service period while the STA 1030 is in the WUR mode and the PCR 1046 is in a doze state.

In the present embodiment, at least part of the WURx of the STA 1030 is a part of the PCR 1046 that remains operational while the PCR 1046 is in the doze state in WUR mode. While the PCR 1046 is in the doze state in WUR mode, the PCR 1046 does not receive the voice frames from the STA 1010 but the STA 1010 may transmit a WUR PPDU with a WUP such as the WUR PPDUs illustrated in FIGS. 2D and 2E, to instruct the WURx of the STA 1030 to wake the PCR 1046 in STA 1030. Upon waking, the PCR 1046 may receive the voice packet from the STA 1010 in accordance with the parameters of the negotiated service period.

In some embodiments, the WURx of the STA 1030 may wake into a non-WUR mode in which the PCR 1046 is active and, in many embodiments, the parameters negotiated for the WUR mode between the STA 1030 and the STA 1010 are no longer maintained by either the STA 1010 or the STA 1030. In other embodiments, the WURx of the STA 1030 may wake into a WUR mode suspend from the WUR mode. The WUR mode suspend may suspend the WUR mode until the STA 1030 is ready to return to the WUR mode with the PCR 1046 in a doze state, in accordance with previously negotiated parameters with the STA 1010. In other words, during the WUR mode suspend, the PCR 1046 is active, the service between the PCR 1046 and the STA 1010 resumes, and both the STA 1010 and the STA 1030 maintain the negotiated parameters for the WUR mode in memory such as the memories 1011 and 1041, respectively.

In many embodiments, the STA 1030 may choose, based on user, designer, or developer preferences, the state of the STA 1030 after receipt of the WUP. For instance, the PCR 1046 may negotiate a default state for the STA 1030 by inclusion of a set of WUR mode parameters in a communication with the STA 1010. The STA 1030 may transmit a WUR request frame such as the WUR request frame 1200 illustrated in FIG. 1C with WUR mode parameter field(s) 1230 that comprise values of the WUR mode parameters. The WUR mode parameter field(s) 1230 may comprise a default state field 1231 that describes the default state in which both STAs 1010 and 1030 agree that the STA 1030 will reside after the STA 1030 receives a WUP. The default state field 1231 may include a WURx power state 1515, an exit from the WUR mode (which is a PCR awake state 1510), or a WURx suspend state 1540, as illustrated in FIG. 1F.

Figure 1F:
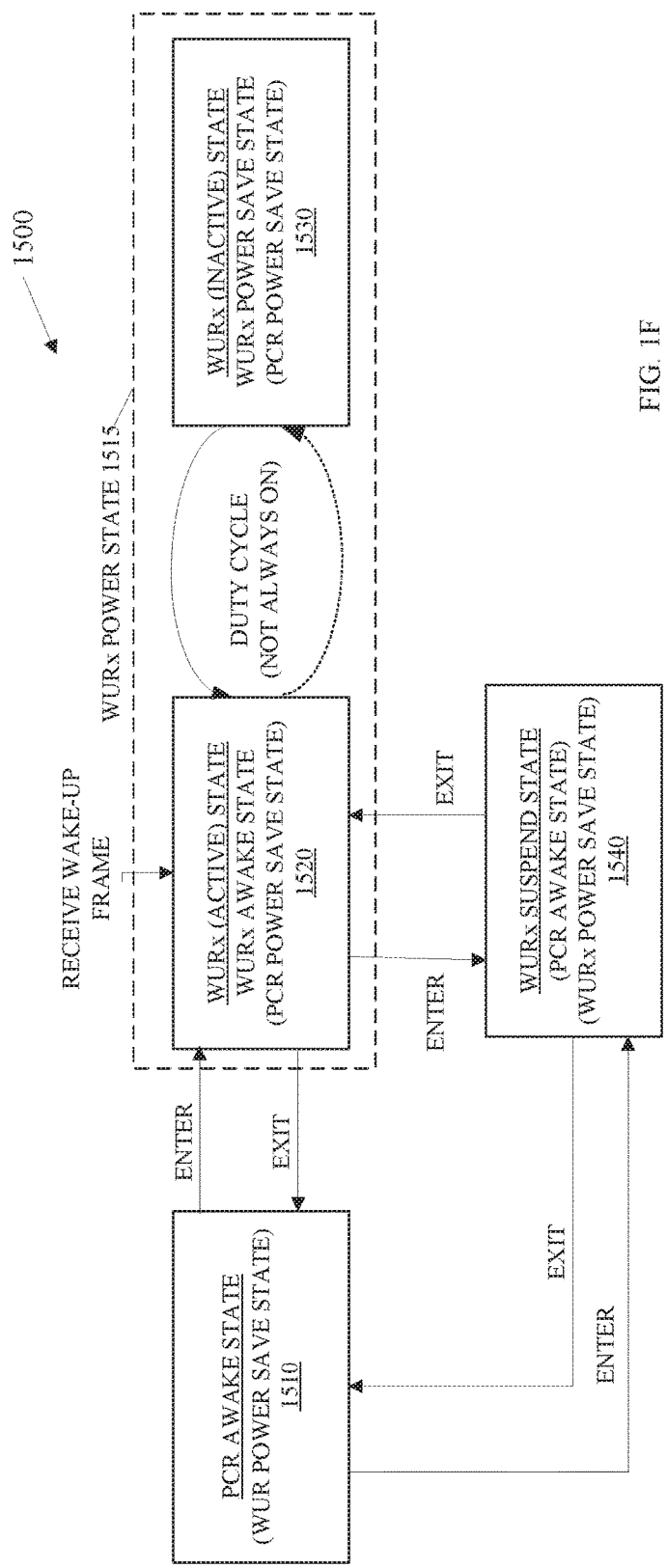

Referring now to FIGS. 1A and 1F, FIG. 1F illustrates an embodiment of a state diagram 1500 of the power states of the WURx of the STA 1030 based on WUR mode parameters negotiated between the WURx of STA 1030 and the STA 1010. In other embodiments, the STA 1030 may negotiate different WUR mode parameters that result in differences in the power states illustrated in FIG. 1F.

In the present embodiment, the WUR logic circuitry 1050 of the STA 1030 may choose as a default state field 1231, the WURx power state 1515 that implements, e.g., a power save protocol like power save mode (PSM), an unscheduled automatic power save delivery (U-APSD) protocol, or a power save polling (PSP) protocol, where a station such as the STA 1030 can initiate an unscheduled service period to retrieve packets from the AP such as the STA 1010 and go back to a WUR mode with the PCR 1046 in a doze state without an additional signaling exchange with the AP.

The MAC logic circuitry 1018 of the STA 1010 and the PCR 1046 including the MAC logic circuitry 1048 of the STA 1030 negotiate the duty cycle schedule along with other WUR mode parameters prior to entry into the WUR mode. During the WUR mode, the WURx of STA 1030 follows the duty cycle schedule (including WURx always on) while the PCR 1046 is in the doze state. Furthermore, the STA 1010 and the STA 1030 suspend the existing negotiated service period for the PCR 1046 of the STA 1030. The negotiated service period may include, for instance, parameters such as the target wake time (TWT) and a schedule for wireless network management (WNM) Sleep Mode that the STA 1030 and the STA 1010 negotiate before the STA 1030 can enter the WUR mode.

While the service period is suspended, the PCR 1046 is not required to wake up during the service period. Furthermore, both the STA 1010 and the STA 1030 maintain or save the negotiated service period parameters in memory such as memories 1011 and 1041, respectively, so that the STA 1030 can resume services in accordance with the negotiated service period parameters when the PCR 1046 returns to a PCR awake state 1510.

The WUR logic circuitry 1050 may also choose as a default state field 1231 value, the PCR awake state 1510. The PCR awake state 1510 terminates the WUR mode and resumes services between the STA 1030 and the STA 1010 in accordance with the negotiated service period parameters. In other words, the STA 1010 and the STA 1030 no longer maintain the negotiated WUR mode parameters. In such embodiments, the PCR 1046 may enter the PCR awake state 1510 more efficiently than an alternative way to exit the WURx power state 1515 that may require a two-way handshake. For example, a station that implements a scheduled power save protocol like TWT may determine that resumption of all negotiated TWT service periods is more useful than remaining in the WUR mode after receipt of the wake-up packet. On the other hand, the STA 1030 may have to perform a signaling exchange to enter WUR mode again.

Furthermore, the WUR logic circuitry 1050 may choose as a default state field 1231 value, the WURx suspend state 1540. When entering the WURx suspend state 1540, the MAC logic circuitry 1048 operate in accordance with WUR mode parameters for a WUR suspend mode and may resume all the negotiated service period parameters of PCR 1046. The WUR mode parameters 1230 for a WUR suspend mode may instruct both the MAC logic circuitry 1048 of the STA 1030 and the MAC logic circuitry 1018 of the STA 1010 to maintain negotiated WUR mode parameters 1230 so that the STA 1030 may re-enter the WURx power state 1515 without re-negotiating the WUR mode parameters 1230. For instance, during an initial entry into the WUR mode, the PCR 1046 of the STA 1030 may transmit a WUR request frame such as the WUR Request/Response frame 1100. The WUR Request/Response frame 1100 may include a WUR mode suspend field 1110 that includes a value that can indicate that the STA 1030 requests entry into a WURx suspend state 1540. If the STAs 1010 and 1030 have already negotiated the WUR mode parameters 1230, the STA 1030 may enter the WURx suspend state 1540. On the other hand, if the STAs 1010 and 1030 have not yet negotiated WUR mode parameters 1230 or no longer maintain negotiated WUR mode parameters 1230, the STAs 1010 and 1030 may negotiate the WUR mode parameters 1230 and then the STA 1030 may enter the WURx suspend state 1540. The WURx suspend state 1540 advantageously reduces the overhead associated with entering and exiting the WUR mode 1515.

Figure 1K:
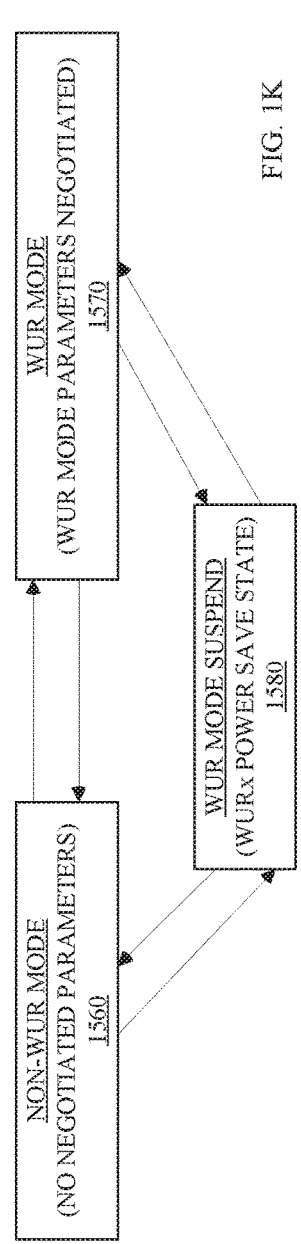

Referring now to FIGS. 1A and 1K, FIG. 1K illustrates an embodiment of a negotiation state diagram 1550. The negotiation state diagram 1550 illustrates each of the negotiated states of a station such as the STA 1030 in FIG. 1A and an access point or peer station such as the STA 1010 in FIG. 1A. The negotiation state diagram 1550 comprises a non-WUR mode 1560, a WUR mode 1570, and a WUR mode suspend 1580. The non-WUR mode 1560 is a state in which the station has not negotiated WUR mode parameters with the access point or peer station such as the WUR mode parameters discussed in conjunction with FIGS. 1C and 2G, or no longer maintains previously negotiated WUR mode parameters. The WUR mode 1570 describes a state of a negotiation in which a station negotiated WUR mode parameters with an access point or peer station and enables WUR operation. The WUR mode suspend 1580 is a state of negotiation in which a station suspends the WUR operation and maintains negotiated WUR mode parameters in memory of the station and in memory of an access point or peer station. The WUR operation includes having the WURx of the station available, including a duty cycle agreement in many embodiments, when the PCR of the station is in a doze state and the negotiated service period of the PCR of the station, if applicable, is suspended.

Entering the non-WUR mode 1560, the WUR mode 1570, and the WUR mode suspend 1580 involves negotiations by the station through frame exchanges such as the frames exchanges shown in FIGS. 1G, 1H, 1I, and 1J. Exiting the WUR mode 1570 or the WUR mode suspend 1580 into the non-WUR mode 1560 involves changing to a state in which the station and the access point or peer station do not maintain the WUR mode parameters or a state in which the station cannot enter into the WUR mode 1570 without a new negotiation of the WUR mode parameters.

Timing diagrams 1600, 1700, 1800, and 1900 illustrated in FIGS. 1G, 1H, 1I, and 1J, respectively, illustrate the advantages. In particular, FIG. 1G illustrates an embodiment of a timing diagram 1600 for a second station (STA) such as the STA 1030 to enter into the WUR mode. Other embodiments may differ but, in the present embodiment, time progresses from left to right in each of the timing diagrams 1600, 1700, 1800, and 1900. At a first time in the timing diagram 1600, the second station transmits a WUR Request frame, such as the WUR Request/Response frame 1100 shown in FIG. 1B or the WUR request frame 1200 shown in FIG. 1C, to the first station (AP). The WUR Request/Response frames 1100 and 1200 may include a WUR mode suspend state field 1110 and 1240, respectively. The WUR mode suspend fields 1110 and 1240 may include one or more bits to indicate whether the second station is requesting entry into the WUR mode or the WUR mode suspend state. For example, a bit in the WUR mode suspend fields 1110 and 1240 may be set to a logical one if the second station is requesting entry into the WUR mode suspend state and may be set to a logical zero if the second station is requesting entry into the WUR mode. In the timing diagram 1600, the second station is requesting entry into the WUR mode.

The WUR Request frame may be an action frame such as the WUR Request/Response frame 1200 illustrated in FIG. 1C or may be another type of frame such as the WUR Request/Response frame 1100 illustrated in FIG. 1B. The WUR Request/Response frame 1200 may include a MAC header, an action ID field 1210, an action field 1220, and a frame check sequence (FCS). The MAC header may include a frame control field, a duration or network allocation vector (NAV), possibly other fields, and one or more addresses similar to the frame 2400 illustrated in FIG. 2F except that action frame may include an action ID field 1210 and an action field 1220 instead of the frame body 2434. Other WUR Request/Response frames may be frames such as the frame 2400.

The action ID 1210 may identify the action element included as the action field 1220 and the action field 1220 may identify the action such as entering or exiting a WUR mode or entering or exiting a WUR mode suspend state. The action field 1220 may comprise the WUR mode parameter field(s) 1230 and a WUR mode suspend state field 1240. The WUR mode parameter field(s) 1230 may comprise the default state field 1231 and a WURx duty cycle field 1232. The default state field 1231 may indicate a default state such as the states described in the state diagram 1500 in FIG. 1F and may be the default state that the second station agrees to be in after receipt of a WUP from the first station.

The WURx duty cycle field 1232 may comprise a value indicative of a duty cycle. The duty cycle may describe a periodic switch by the WURx between a WURx (active) state 1520 (also referred to as the WURx awake state) and a WURx (inactive) state 1530 (also referred to as a WURx power save state). The WURx (active) state 1520 is the state during which the WURx may receive a wake-up packet and the WURx (inactive) state 1530 is a WURx power save state for the WURx during which the WURx is not able to receive a wake-up packet. Furthermore, the WUR mode suspend state field 1240 may include a value to indicate if the second station is requesting to enter a WURx suspend state 1540 or requesting to exit a WURx suspend state 1540 rather than entering or exiting the WURx power state 1515 with the WUR Request frame.

Note that the inclusion of the access point (AP) as the first station such as the STA 1010 in FIG. 1A is one embodiment. In other embodiments, the first station in each of these timing diagrams 1600-1900, may be a peer station rather than an AP.

The first station receives the WUR request frame and, in response, at a second time, the first station transmits an acknowledgement (ACK) such as the ACK 1300 illustrated in FIG. 1D. The ACK 1300 includes a MAC header and a frame check sequence (FCS). In other embodiments, the ACK may take other forms such as a physical layer ACK with no MAC payload such as the physical layer preamble 1400 illustrated in FIG. 1E, which includes a legacy preamble and a high efficiency preamble. In other embodiments, the physical layer preamble may only include a legacy preamble as illustrated in FIG. 2E. Note that the WUR preamble is also part of the physical layer preamble.

The second station receives the ACK from the first station at the second time and the first station transmits a WUR Response frame, such as the WUR Request/Response frame 1100 or 1200, an interframe space thereafter. In some embodiments, the WUR Response frame includes the WUR mode suspend state field 1110 (or 1240) and, in other embodiments, the WUR Response frame does not include the WUR mode suspend state field 1110 (or 1240). In some embodiments, the WUR Response frame includes the WUR mode parameter fields 1230 with values for the WUR mode parameters. In other embodiments, the first station does not include the WUR mode parameter field(s) 1230 if the first station accepts the WUR mode parameters transmitted by the second station in the WUR Request frame.

The second station receives the WUR Response frame from the first station, which confirms the entry by the second station into the WUR mode and confirms the negotiated WUR mode parameters. In response, the second station confirms receipt of the WUR Response frame and transmits an ACK to the first station prior to entering the WUR mode.

The timing diagram 1700 in FIG. 1H illustrates the protocol for the second station exiting the WUR mode for situations in which the second station does not exit by other means. The second station begins at a first time by transmitting a WUR Request frame such as the WUR Request/Response frames 1100 and 1200 with an indication that the second station intends to exit the WUR mode. The first station receives the WUR Request frame and acknowledges receipt by transmitting an ACK to the second station. Thereafter, such as an interframe space like a short interframe space (SIFS), at a third time, the first station transmits a WUR Response frame confirming that the second station will exit the WUR mode and, implicitly, in many embodiments, confirming that the negotiated service period for the PCR of the second station will resume. The second station may respond to the WUR Response frame with an ACK to confirm exit from the WUR mode.

Note that exiting the WUR mode to a non-WUR mode terminates the negotiated WUR mode parameters. As a result, when the second station determines to enter the WUR mode again, the second station re-negotiates the WUR mode parameters. Both negotiating the WUR mode parameters, as illustrated in FIG. 1G and exiting the WUR mode involve a two-way hand shake. Once the stations negotiate the WUR mode parameters, the second station can enter and exit the WUR mode with a one-way handshake, advantageously reducing data traffic and power consumption expended by the first device and the second device. Furthermore, the second station may advantageously negotiate the WUR mode parameters without entering the WUR mode 1515.

Referring now to FIGS. 1I and 1F, FIG. 1I illustrates an embodiment of a timing diagram 1800 for the second station entering a WUR mode suspend and FIG. 1F illustrates an embodiment of a state diagram 1500. For the purposes of this discussion, we assume that the second station such as the STA 1030 is in the non-WUR mode and transmits a WUR Request frame to the first station such as the STA 1010 to request entry into the WUR mode suspend. During the PCR awake state 1510, the PCR 1046 is awake and negotiates a service period with the first station for the first station to periodically transmit data, such as every 10 microseconds, to the second station. The second station includes a WURx such as the WUR logic circuitry 1050 and the WUR circuitry 1054 in the network I/F (PCR) 1046 shown in FIG. 1A. At the non WUR mode, the second station can enter a WUR mode or enter the WUR mode suspend.

To reduce power consumption, the second station may determine to enter the WUR mode periodically. The WUR Request frame includes a value in a WUR mode suspend state field that indicates that the request is to enter the WUR mode suspend rather than the WUR mode. The WUR Request frame includes a WURx duty cycle such as 50 percent, or the equivalent in time units, to indicate that, during the WUR mode with the PCR in a doze state, the WURx will remain in the WURx (active) state 1520 for half of the time and will remain in the WURx (inactive) state 1530 for the other half of the time. The duty cycle may indicate, e.g., a periodic change of states between the WURx (active) state 1520 and the WURx (inactive) state 1530 every, e.g., 10 microseconds. In other embodiments, the WURx may always remain in the WURx (active) state 1520.

In response to receipt of the WUR Request frame, the first station may respond with an ACK to confirm entry into the WUR mode suspend. In the present example, the second station has not negotiated WUR mode parameters yet so the first station may also respond with a WUR Response frame to confirm the negotiated parameters for entry into the WUR mode suspend. The second station may respond with an ACK and enter the WUR mode suspend.

During the WUR mode suspend, the PCR 1046 is awake, the WURx may be in a WURx power save state, and the service period negotiated between the second station and the first station may remain active. In other words, the first station continues to transmit data to the PCR 1046 every 10 microseconds.

At the WUR mode suspend, the second station can exit the WUR mode such as illustrated in FIG. 1G or enter the WUR mode into, e.g., the WURx (active) state 1520 by exiting the WUR mode suspend as illustrated in the timing diagram 1900 in FIG. 1J. For example, the second station may determine to exit the WUR mode suspend by transmitting a WUR Request frame to the first station at a first time. An interframe space thereafter, at a second time, the first station may respond with an ACK.

After receipt of the ACK, the PCR of the second station may enter a sleep mode or other power save mode and the WURx may enter an awake mode to place the second station in the WURx (active) state 1520. At the WURx (active) state 1520, the WURx may periodically enter the WURx (inactive) state 1530 in accordance with the duty cycle negotiated in the WUR mode parameters with the first station. As a result, the first station can determine when the WURx of the second station is active and inactive for the purposes of determining when to transmit a WUP to the second station to wake the PCR of the second station.

The WUR mode parameters negotiated between the first station and the second station may also comprise a default state that indicates the state, agreed upon in the WUR mode parameters by the first station and the second station, in which the second station may reside at the receipt of the WUP by the second station from the first station.

The STAs 1010 and 1030 comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code in the memory 1011 and 1041. The memory 1011 and 1041 may comprise a storage medium such as Dynamic Random-Access Memory (DRAM), read only memory (ROM), buffers, registers, cache, flash memory, hard disk drives, solid-state drives, or the like. The memory 1011 and 1041 may store the frames, frame structures, frame headers, or the like, and may also comprise code WUR logic such as code to execute on a processor or to direct actions of logic circuitry such as logic circuits, state machines, application-specific integrated circuits (ASICs), and/or the like 1012 and 1042, respectively.

A timestamp is a value from a timing synchronization function (TSF) timer in an AP such as the STA 1010 that the AP uses to synchronize the stations associated with the basic service set (BSS) and in the STA 1030 so that the STA 1030 can synchronize its TSF timer 1035 with that of the AP while associated with the AP to synchronize communications. The TSF timer, such as TSF timers 1005 and 1035 in FIG. 1A, may reside in a chipset of the station such as STAs 1010 and 1030, in some embodiments, and may reside elsewhere in the station in other embodiments.

The AP may transmit the beacon frame periodically, via a network interface that may also be a PCR 1016 of the AP, and capture the value in the timing synchronization function (TSF) timer at the time of transmission to include in a frame body of the beacon frame as the timestamp. A station, such as the STA 1030 in FIG. 1A, receives the beacon frame via the primary connectivity radio (PCR) 1046 such as the wireless network interface 1052 and corrects the TSF timer 1035 for the STA 1030. The correction of the TSF timer for the STA 1030 synchronizes the station with the BSS by updating the value in the TSF timer 1035.

The MAC logic circuitry 1018 and 1048 may comprise one or more circuits to implement MAC layer functionality and management service interfaces through which MAC layer management functions may be invoked. The MAC logic circuitry 1018 and 1048 may comprise one or more processors to execute MAC layer code stored in the memory 1011 and 1041, respectively. In other embodiments, the MAC logic circuitry 1018 and 1048 may comprise interface circuitry to execute code on the one or more processors 1001 and 1031, respectively.

The MAC logic circuitry 1018 and 1048 may communicate with the physical layer (PHY) logic circuitry of wireless network interfaces 1022 and 1052, respectively, to pass a PHY frame such as an ACK or may pass or communicate a MAC frame such as a WUR Request frame or ACK to the PHY logic circuitry to transmit to the STA 1030 and the STA 1010, respectively. The MAC logic circuitry 1018 and 1048 may generate frames such as management, data, and control frames.

The PHY logic circuitry 1023 and 1053 of wireless network interfaces 1022 and 1052, respectively, may prepare the MAC frame for transmission by, e.g., determining a preamble to prepend to a MAC frame to create a PHY frame. In some embodiments, the PHY logic circuitry 1023 and 1053 may interact with baseband circuitry of the MAC logic circuitry 1018 and 1048, respectively, to prepare the MAC frame for transmission. The preamble may include one or more short training field (STF) values, long training field (LTF) values, and signal (SIG) field values. The wireless network interfaces 1022 and 1052 may be PHY layer devices including a transmitter and a receiver and the transmitter may process the PHY frame for transmission via the radios 1026 and 1056, respectively, and the antennas 1028 and 1058, respectively.

After processing the PHY frame, the radios 1026 and 1056, each comprising an RF transmitter and an RF receiver, may impress digital data onto subcarriers of RF frequencies for transmission by electromagnetic radiation via elements of an antenna array or antennas 1028 and 1058, respectively. The RF receiver receives electromagnetic energy, extracts the digital data, and decodes the frame.

Figure 2A:
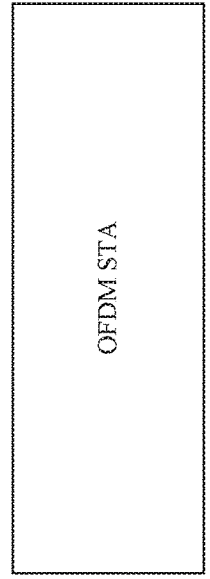
FIGS. 2A-C depicts an embodiment of transmissions between four stations and an AP, an embodiment of a transmission between one station and an AP, and an embodiment of a resource units in a 20 Megahertz (MHz) bandwidth.
Figure 2B:
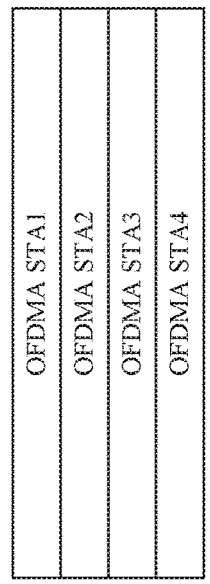
Figure 2C:
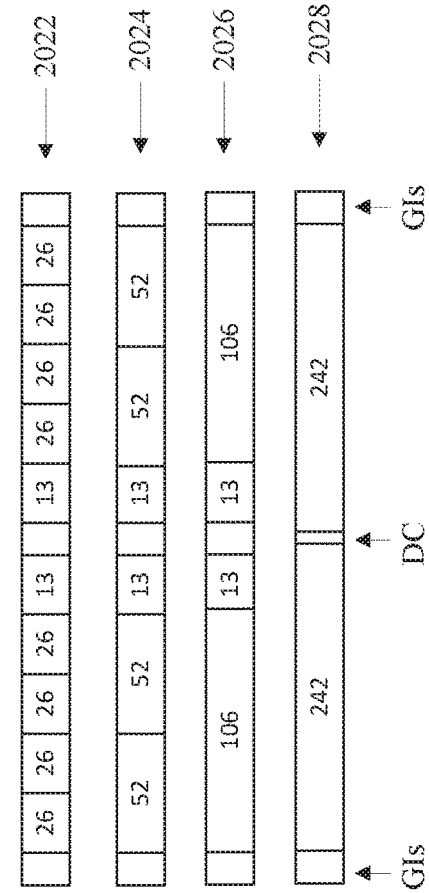

FIGS. 2A-2C illustrate embodiments of channels and subchannels (or resource units) that can facilitate multiple transmissions simultaneously along with transmission of a WUR PPDU. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 subcarriers for data transmission including the two sets of 13 subcarriers on either side of the DC. The RU configuration 2024 illustrates the same bandwidth divided into 5 RUs including four RUs with 52 subcarriers and one RU with 26 subcarriers about the DC for data transmission. The RU configuration 2026 illustrates the same bandwidth divided into 3 RUs including two RUs with 106 subcarriers and one RU with 26 subcarriers about the DC for data transmission. And the RU configuration 2028 illustrates the same bandwidth divided into 2 RUs including two RUs with 242 subcarriers about the DC for data transmission. Embodiments may be capable of additional or alternative bandwidths such as such as 40 MHz, 80 MHz, 160 MHz and 80+80 MHz.

Figure 2D:
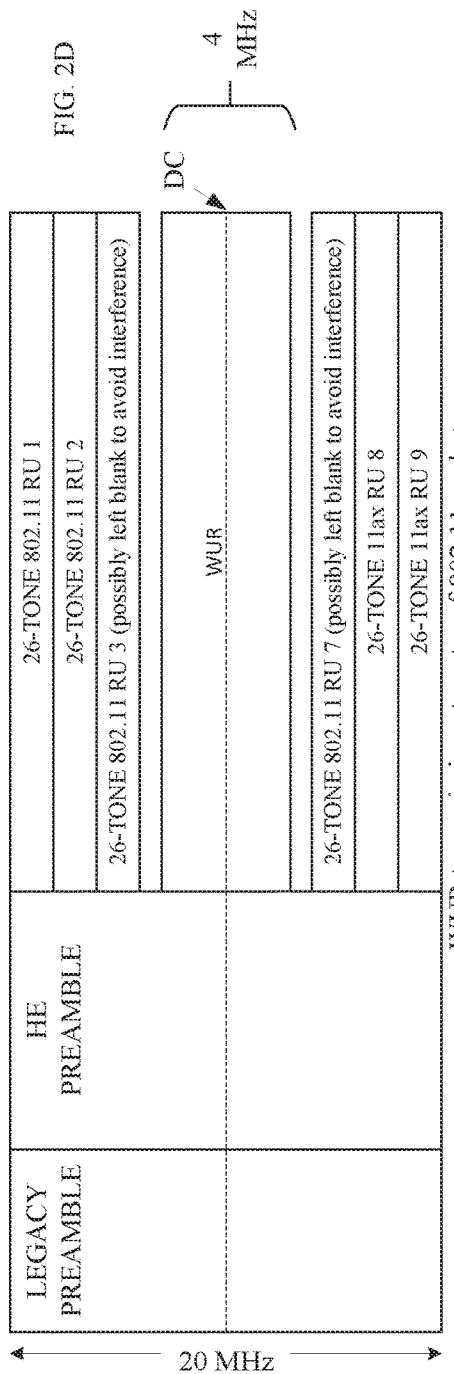
FIG. 2D depicts an embodiment of a wake-up radio (WUR) physical layer protocol unit (PPDU) in a form of an IEEE 802.11 orthogonal frequency-division multiple access (OFDMA) modulated signal with a wake-up packet at the center resource unit.
Figure 2E:
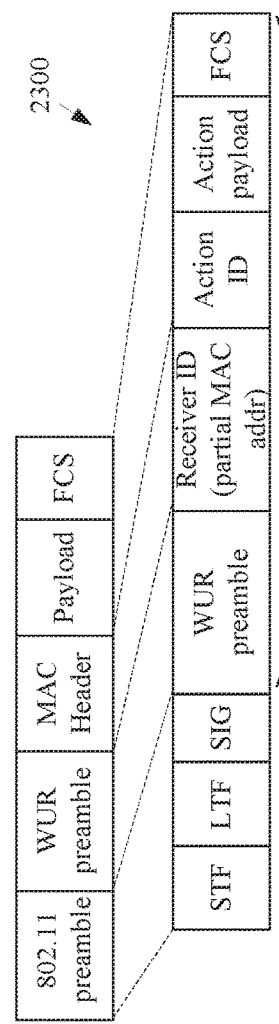
FIG. 2E depicts an embodiment of WUR PPDU comprising a wake-up packet prepended by an IEEE 802.11 physical layer preamble.
Figure 2F:
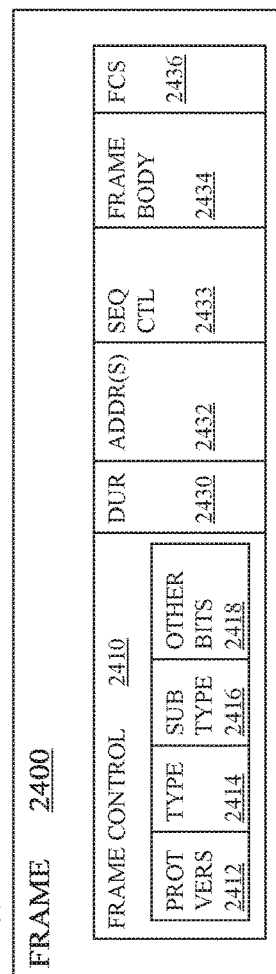
FIGS. 2F-G depicts embodiments of a management frame and a wake-up radio capability element.
Figure 2G:
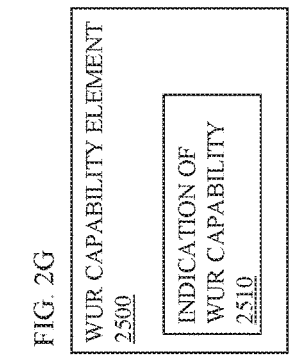

FIG. 2D illustrates an embodiment of a WUR PPDU in the form of an 802.11, multi-user, orthogonal frequency division multiple access (OFDMA) packet that is capable of multiple transmissions on different RUs of a 20 MHz channel. In some embodiments, the WUR circuitry may transmit a WUP on a sub-band of the WUR PPDU transmission without transmitting packets in other sub-bands of the channel. The basic idea is shown by the example given in FIG. 2D, where the PHY transmits the WUR packet at the center of the band in a multi-user OFDMA transmission that multiplexes, e.g., IEEE 802.11ax transmissions in frequency within the same multi-user OFDMA packet. In other words, the PHY transmits multiple different packets on different resource units or frequency sub-bands within the channel simultaneously.

Many embodiments transmit a WUR preamble of the WUR PPDU to synchronize with a WUR of another device. In some embodiments, the WUR preamble may also include a rate field or a signal field that includes a transmission rate for a medium access control (MAC) layer packet that follows the WUR preamble. Other embodiments may only be capable of receiving the WUR packet at one rate and, in such embodiments, the WUR packet may not include a rate field or signal field with a transmission rate.

After transmission of the WUR packet, the WUR circuitry of the PHY of the receiving device may decode the receiver address. Once the WUR circuitry decodes the receiver address, the MAC layer circuitry may determine if the receiver address is addressed to the WUR circuitry. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

The WUR of each communications device may have a unique address. In some embodiments, the address of the WUR differs from the address assigned to main radio (PCR) of the communications device, such as the MAC address or AID of an IEEE 802.11ax main radio. In other embodiments, the addresses of the main radio and the WUR is the same.

The FIG. 2E illustrates an embodiment of a WUR packet structure as part of a WUR PPDU 2300. The WUR PPDU 2300 comprises a single STF field, LTF field, and SIG field. These fields represent an IEEE 802.11 preamble such as an IEEE 802.11ah preamble. For IEEE 802.11ax, the preamble may include a legacy IEEE 802.11 preamble followed by a high efficiency (HE) preamble.

After the 802.11 preamble(s), which may be transmitted across the entire bandwidth of the channel, the WUR packet structure comprises a WUR preamble, a MAC header, a payload, and a frame check sequence (FCS) field.

The MAC header may include a receiver address. In some embodiments, the MAC header may include more fields.

The payload may include an action identifier (ID) and an action payload. The action ID may identify the structure of the action payload and the action payload may include an instruction to wake a main radio such as an IEEE 802.11ax radio either immediately or after a period of time. In some embodiments, the period of time may identify a target time for the main radio to be ready to receive a packet.

Transmission at the AP may involve utilization of one or more of transmission rates of the WUR packet. Reception at WUR devices may involve a WUR device that is unaware whether the packet is a multi-user (e.g., multiplexed with 802.11ax) or a single user transmission.

FIG. 2F depicts an embodiment of a frame 2400 such as an association or reassociation frame. The frame 2400 is one embodiment of a frame that can transmit the WUR capability element 2500 with an indication of a WUR capability 2510 illustrated in FIG. 2G. The choice of fields for communicating information may be application specific. In other embodiments, for example, the frame 2400 may have more or less fields, different fields, and/or fields with different field lengths.

The frame 2400 may comprise a MAC header with a frame control field 2410, a duration field 2430, address(es) field(s) 2432, a sequence control field 2433, a frame body 2434, and a frame check sequence (FCS) field 2436. The frame control field 2410 may comprise a protocol version field 2412, a type field 2414, a subtype field 2416, and other frame control bits 2418. The protocol version field 2412 may represent the revision of the corresponding standard that the frame represents. The type field 2414 may identify the type of frame 2414 as, e.g., a control frame. The subtype field 2416 may identify the subtype of the frame as, e.g., a particular type of control frame such as an association frame. The other frame control bits 2418 may represent additional fields that may be present in the frame control field such as a more fragments field, a retry field, a power management field, a more data field, or the like.

The duration field 2430 may include a duration of a network allocation vector (NAV) reminder in microseconds. The ADDR(s) field(s) 2432 may include a broadcast address to broadcast to each station associated with the STA 1010 or an address of a specific STA. The ADDR(s) field(s) 2432 may include a full or partial address such as a MAC address of a STA.

Figure 3:
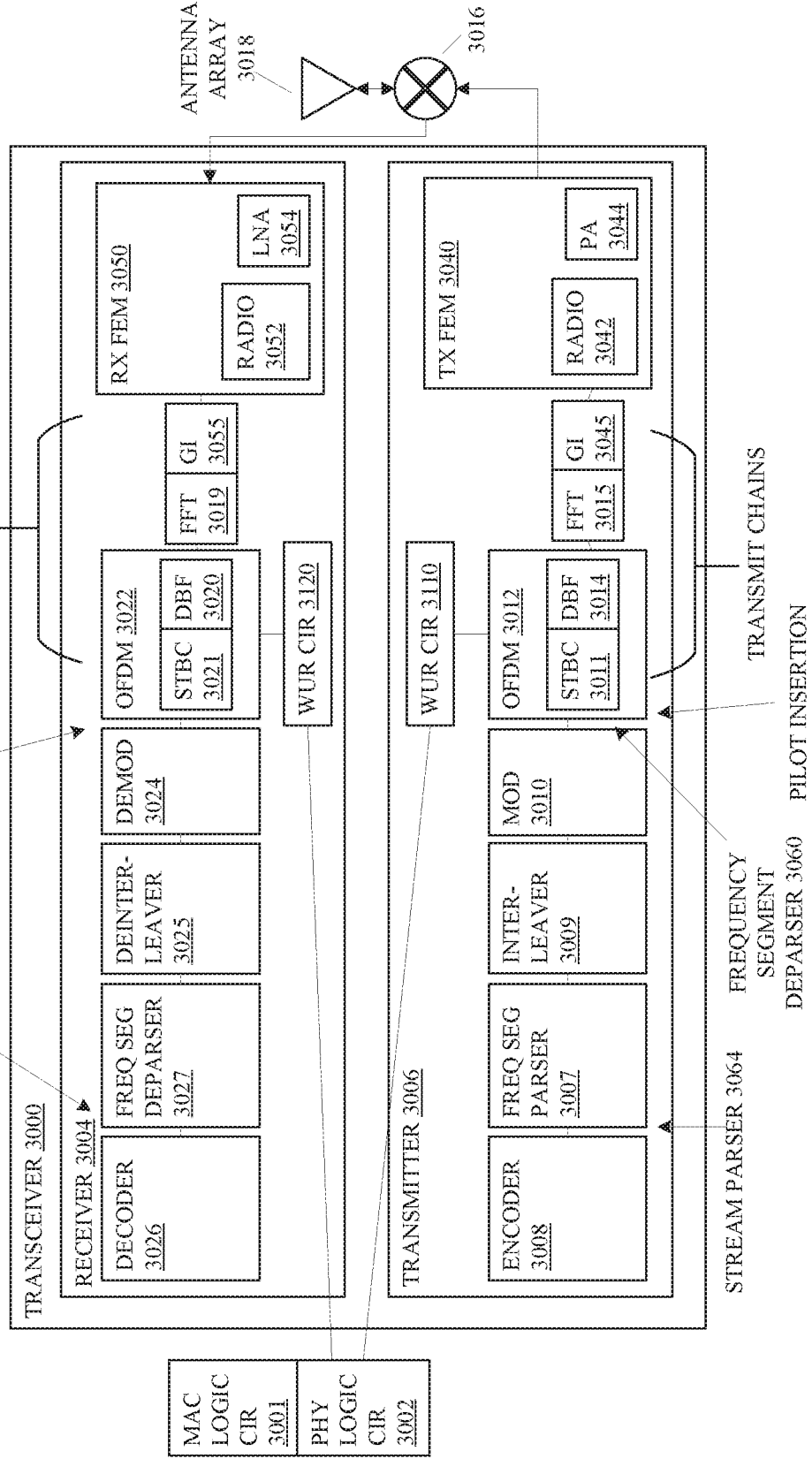
FIG. 3 depicts an embodiment of an apparatus for frame transmissions.

FIG. 3 depicts an embodiment of an apparatus to generate, transmit, receive, and interpret or decode PHY frames and MAC frames with a WUR packet to support compatible low rate for wake-up radio packet transmission. The apparatus comprises a transceiver 3000 coupled with MAC logic circuitry 3001 and PHY logic circuitry 3002. The MAC logic circuitry 3001 and PHY logic circuitry 3002 may comprise code executing on processing circuitry of a baseband processor and/or other processor; circuitry to implement operations of functionality of the MAC or PHY; or a combination of both. The MAC logic circuitry 3001 may determine a frame such as a WUR frame and the PHY logic circuitry 3002 may determine the physical layer protocol data unit (PPDU) by prepending the frame or multiple frames, also called MAC protocol data units (MPDUs), with a preamble to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments.

In the present embodiment, the transceiver 3000 includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the PCR) to generate a WUR packet. For instance, the WUR circuitry 3110 may generate an OOK signal with OFDM symbols to generate a WUR packet for transmission via the antenna array 3018.

Note that a station such as the STA 1010 in FIG. 1A may comprise multiple transmitters to facilitate concurrent transmissions on multiple contiguous and/or non-contiguous carrier frequencies and WUR circuitry 3110 may couple with more than one of the transmitters or more than one of the transmitters may comprise instances of WUR circuitry to facilitate simultaneous WUR packet transmissions in one or multiple 802.11 packets (WUR PPDUs) on channels with bandwidths such as 40 MHz, 80 MHz, and 160 MHz. In other embodiments, the WUR may comprise an independent circuitry that does not use portions of the transmitter 3006.

The WUR circuitry 3120 may comprise circuitry to use portions of the receiver 3004 while in a WUR mode with the PCR is in a power save mode and the wake-up radio is in a WURx active mode or a WURx inactive mode. The WUR circuitry 3120 may comprise circuitry to use portions of the receiver 3004 (a receiver of the PCR) to receive a WUR packet in the form of OFDM OOK symbols while the remainder of the receiver 3004 (the PCR) is in a power save mode.

The transmitter 3006 may comprise one or more of an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3001 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 160 MHz. Other embodiments may continue to process the frequency segments as separate data streams for, e.g. a non-contiguous 80+80 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the transmitter front end module (TX FEM) 3040. The transmitter front end 3040 may comprise a radio 3042 with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a radio 3052 with a low noise amplifier (LNA) 3054. The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals, or may deparse the frequency segments determined by the optional frequency segment parser 3062. The decoder 3026 decodes the data from the demodulator 3024 and transmits the decoded information, the MPDU, to the MAC sublayer logic 3001.

The MAC logic circuitry 3001 may parse the MPDU based upon a format defined in the communications device for a frame to determine the particular type of frame by determining the type value and the subtype value. The MAC logic circuitry 3001 may then interpret the remainder of MPDU.

While the description of FIG. 3 focuses on a single spatial stream system for simplicity, many embodiments are capable of multiple spatial stream transmissions and use parallel data processing paths for multiple spatial streams from the PHY logic circuitry 3002 through to transmission. Further embodiments may include the use of multiple encoders to afford implementation flexibility.

FIGS. 4A-B depict embodiments of flowcharts 4000 and 4100 to transmit communications with a frame. Referring to FIG. 4A, the flowchart 4000 may begin with a wireless network interface of a communications device such as the STAs 1010 and 1030 in FIG. 1A, generating an 802.11 preamble for transmission on a channel (element 4010) such as a high-efficiency preamble shown in FIG. 2D or the legacy 802.11 preamble shown in FIG. 2E. The legacy 802.11 preambles may include, for instance, 802.11a preambles, 802.11n preambles, 802.11ac preambles, and/or other older standard preambles.

A MAC layer logic circuitry of the wireless network interface may generate a MAC frame as a wake-up radio (WUR) packet to transmit to other devices of a network, including a wake-up radio preamble (element 4015) and a frame body. The frame body may include, e.g., a receiver address and a frame body and the MAC layer logic circuitry may pass the MAC frame as an MAC protocol data unit (MPDU) to a PHY logic circuitry of the wireless network interface. The MAC frame may comprise a wake-up packet (WUP) to wake a PCR of a WURx. The PHY logic circuitry may transform or convert the data into a packet of on-off keying (OOK) orthogonal frequency division multiplexing (OFDM) symbols that can be transmitted to a STA after transmission of the 802.11 preamble.

The wireless network interface may transmit a wake-up radio preamble on a sub-band of the channel after transmission of the 802.11 preamble as OOK symbols in the time domain and may transmit the remainder of the WUR packet after transmission of the wake-up radio preamble as one or more OOK symbols at a rate indicated by the WUR preamble for transmission on the sub-band (element 4020). For example, a PHY device of the wireless network interface may pass OOK symbols to the radio and antenna array for transmission.

Referring to FIG. 4B, the flowchart 4100 begins with a PCR of a device such as the PCR 1016 in FIG. 1A generating and transmitting, via an antenna array, an 802.11 preamble for an OFDMA packet on a channel (element 4110). The PCR may generate an 802.11 physical layer data unit (PPDU) as well as a wake-up radio (WUR) packet concurrently with transmission of the 802.11 preamble. After transmission of the 802.11 preamble, the PCR may transmit, via an antenna array, the remainder of the 802.11 PPDU on a first sub-band of the channel concurrently with transmission of the WUR packet on a second sub-band of the channel (element 4115). For example, the PCR may transmit the remainder of the 802.11 PPDU on a first sub-band of the channel at a high-efficiency transmission rate and WUR circuitry may concurrently transmit the WUR packet with a MAC frame.

Referring to FIG. 4C, the flowchart 4250 begins with a wake-up radio logic circuitry of a wake-up radio receiver, such as the WUR logic circuitry 1050 and WUR circuitry 1054 in FIG. 1A, receiving and decoding, via an antenna array, a wake-up radio preamble for a wake-up radio frame on one of the sub-channels of a channel (element 4252). The wake-up radio logic circuitry may decode the preamble to determine the rate of the transmission for the wake-up radio frame (element 4254).

After identifying the transmission rate from the wake-up radio preamble, the WUR logic circuitry may receive the data from the PHY based on the data transmission rate (element 4256).

Figure 4E:
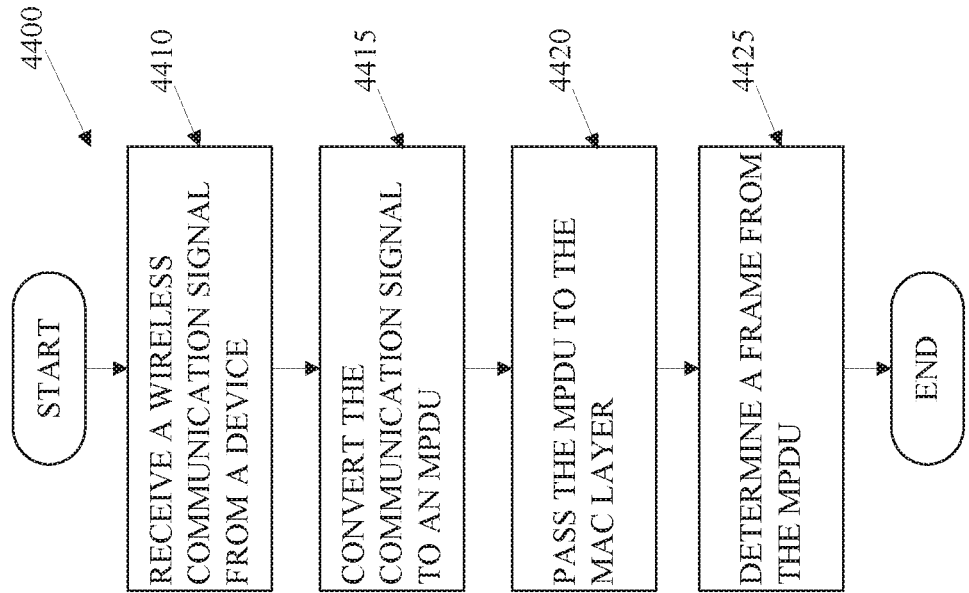
FIGS. 4D-E depict embodiments of flowcharts to generate and transmit frames and receive and interpret frames for communications between wireless communication devices.
Figure 4D:
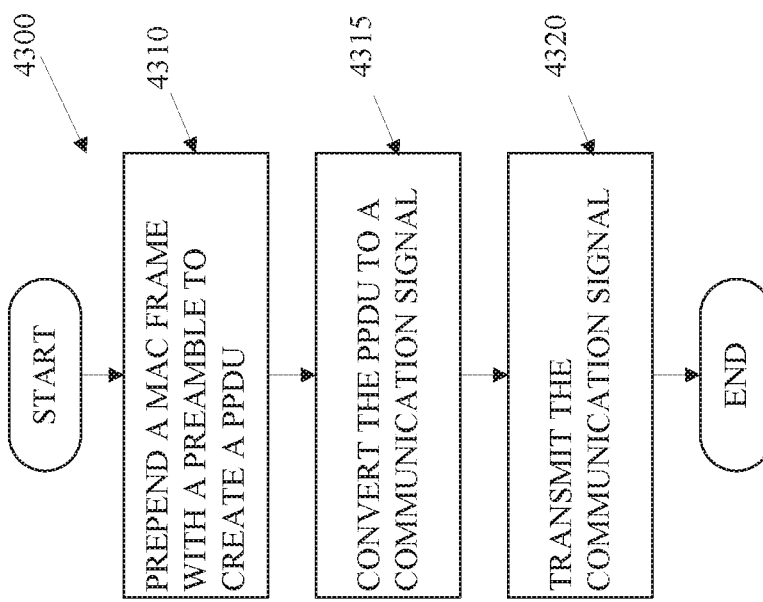

FIGS. 4D-E depict embodiments of flowcharts 4300 and 4400 to transmit, receive, and interpret communications with a frame. Referring to FIG. 4D, the flowchart 4300 may begin with receiving a WUR frame from the PCR 1080 (or the WUR circuitry 1024) of the STA 1010 by the PCR 1046 (or the WUR circuitry 1054) of the STA 1030. The MAC layer logic circuitry of the STA 1030 may generate a frame responsive to the WUR frame as an ACK frame to transmit to the STA 1010 and may pass the frame as an MAC protocol data unit (MPDU) to a PHY logic circuitry. The PHY logic circuitry may encode and transform the data into OFDM symbols for transmission to the STA 1010. The PHY logic circuitry may generate a preamble to prepend the PHY service data unit (PSDU) (the MPDU) to form a PHY protocol data unit (PPDU) for transmission (element 4310). In some embodiments, more than one MPDU may be included in a PPDU.

The physical layer device such as the transmitter 3006 in FIG. 3 or the wireless network interfaces 1022 and 1052 in FIG. 1A may convert the PPDU to a communication signal (element 4315). The transmitter may then transmit the communication signal via the antenna (element 4320).

Referring to FIG. 4E, the flowchart 4400 begins with a receiver of a device such as the receiver 3004 in FIG. 3 receiving a communication signal via one or more antenna(s) such as an antenna element of antenna array 3018 (element 4410). The receiver may convert the communication signal into an MPDU in accordance with the process described in the preamble (element 4415). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, quadrature phase shift keying (QPSK), or staggered quadrature phase shift keying (SQPSK). And the decoder such as the decoder 3026 decodes the signal information from the demodulator via, e.g., BCC or LDPC, to extract the MPDU and pass or communicate the MPDU to MAC layer logic such as MAC logic circuitry 3001 (element 4420).

The MAC logic circuitry may determine frame field values from the MPDU (element 4425) such as the management frame fields in the management frame 2400 shown in FIG. 2F. For instance, the MAC logic circuitry may determine frame field values such as the type and subtype field values of the synch frame. The MAC sublayer logic may determine that the MPDU comprises a WUR beacon frame so the MAC logic circuitry may generate a response frame.

Figure 4G:
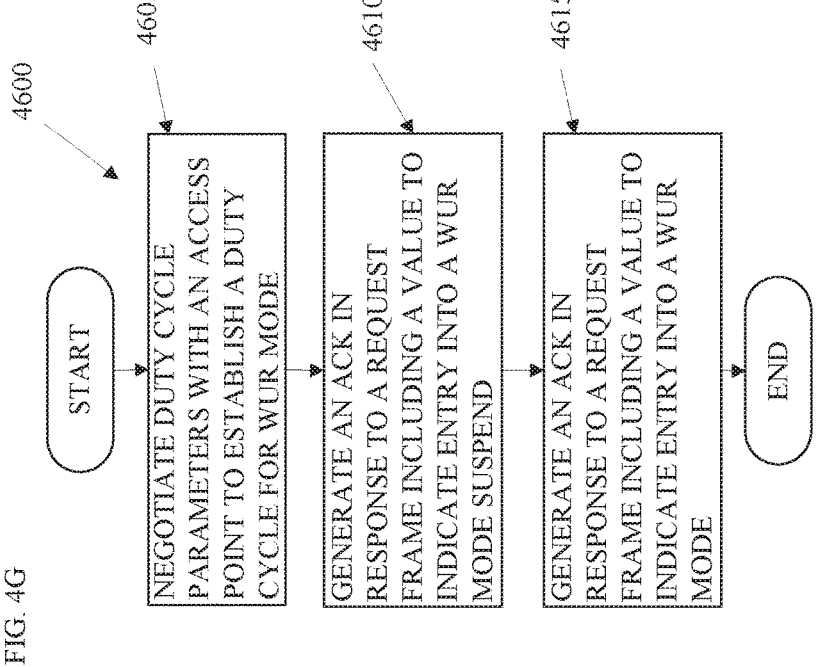
FIGS. 4F-G depict embodiments of flowcharts to suspend a WUR mode of a station.
Figure 4F:
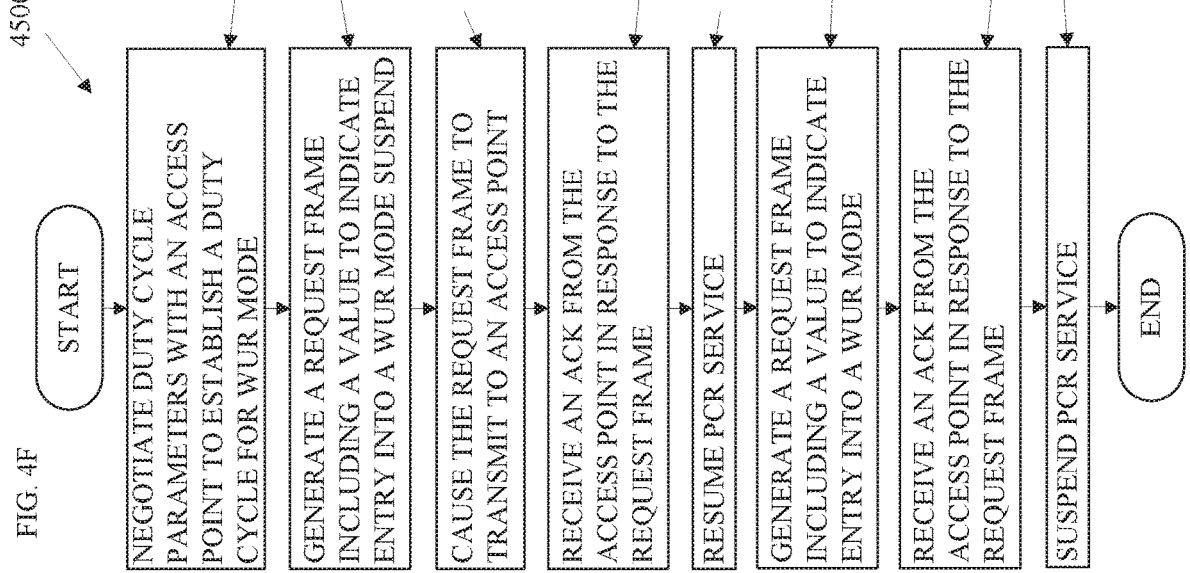

FIGS. 4F-G depict embodiments of flowcharts 4500 and 4600 to suspend a WUR mode of a station such as the STA 1030 shown in FIG. 1A. Referring to FIG. 4F, the flowchart 4500 may begin with a PCR of a station, such as the STA 1030 shown in FIG. 1A, negotiating duty cycle parameters with an access point to establish a duty cycle for a WUR mode during entry into a WUR mode or prior to entry into a WUR mode (element 4505). The PCR of the station performs negotiation of the WUR mode parameters and such negotiation may occur prior to entry into the WUR mode by a station such as during association or reassociation with the access point by the PCR of the station such as the PCR 1046 of the STA 1030 in FIG. 1A. Alternatively, negotiation of the duty cycle may occur during a request by a station to enter a WUR mode. Note that the duty cycle parameters may be part of the WUR mode parameters that can be transmitted in a WUR request and/or WUR response frame such as the frame 1230 shown in FIG. 1C or may comprise part of the WUR capability element transmitted in a frame such as the WUR capability element 2500 shown in FIG. 2G and the frame 2400 shown in FIG. 2F.

In the present embodiment, after negotiating the duty cycle parameters, the station may generate a request frame including a value to indicate entry into a WUR suspend mode from a WUR mode (element 4510) and cause the request frame to transmit to the access point (element 4515). For instance, the MAC logic circuitry of a baseband processor may generate the request frame as a MAC frame and pass the MAC frame to a physical layer device such as a transceiver 300 shown in FIG. 3. The physical layer device may generate OFDM symbols in multiple spatial signals and convert the signals to the time domain for transmission on subcarriers of a channel by the transmitter front end module and an antenna array.

In response to the request frame, the station may receive an acknowledgement from the access point (element 4520) to indicate acceptance of the entry into the WUR mode suspend. When entering the WUR mode suspend, the service period negotiated between the access point and the PCR of the station may resume (element 4525). The WUR mode suspend may allow the station to temporarily exit the WUR mode to facilitate communication between the PCR of the station and the access point while both the access point and the station maintain the negotiated WUR mode parameters. Maintenance of the negotiated WUR mode parameters may allow the station to switch back into the WUR mode without negotiating the WUR mode parameters, such as the duty cycle, again.

After entering the WUR mode suspend, the PCR of the station may generate a request frame with an indication of entry into a WUR mode (element 4530) to indicate an intention to return to WUR mode to the access point. The access point may respond to the station with an acknowledgement to indicate acceptance of entry into the WUR mode (element 4535). The station and the access point may, in response to the frame exchange, suspend the PCR service period negotiated between the PCR of the station and the access point (element 4540) and the PCR may enter a doze state.

Referring to FIG. 4G, the flowchart 4600 begins with an access point, such as the STA 1010 in FIG. 1A, negotiating duty cycle parameters with a PCR of a station, such as the PCR 1046 of the STA 1030 in FIG. 1A (element 4605). The negotiation of the duty cycle parameters may be in response to receipt of a frame from the PCR of the station such as an association frame or a WUR request frame such as the frames 2400 in FIG. 2F and 1200 in FIG. 1C.

After negotiation of the duty cycle as well as other WUR mode parameters, the access point may receive a request frame from the station indicating entry into a WUR mode suspend. In other words, the station may request to enter the WUR mode suspend to, e.g., temporarily reestablish a negotiated service period between the PCR of the station and the access point. The access point may generate an acknowledgement to accept entry in the WUR mode by the station in response to the request frame (element 4610).

Thereafter, the access point may receive a request frame with a value to indicate entry into the WUR mode from the WUR mode suspend and the access point may generate an acknowledgement to accept entry into the WUR mode by the station (element 4615).

Figure 5:
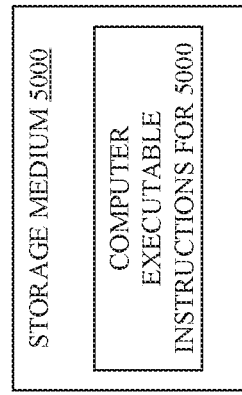
FIGS. 5-6 included herein to depict a computer-readable storage medium and a computing platform for WUR operations.

FIG. 5 illustrates an example of a storage medium 5000 to store pre-population logic such as one or more prepopulation executables. Storage medium 5000 may comprise an article of manufacture. In some examples, storage medium 5000 may include any non-transitory computer readable medium or machine-readable medium, such as an optical, magnetic or semiconductor storage. Storage medium 5000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 6:
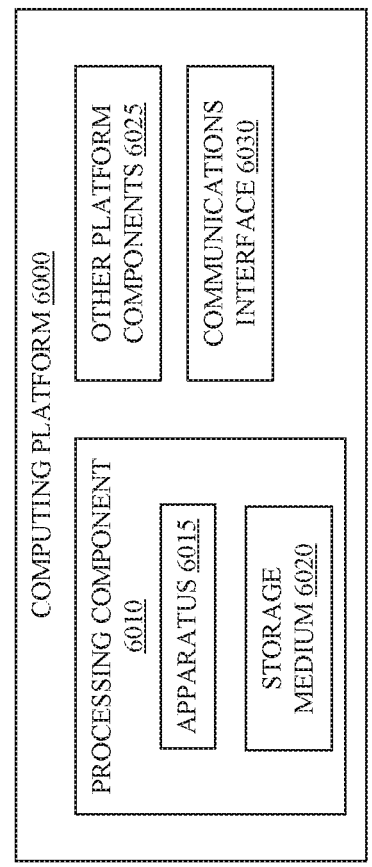

FIG. 6 illustrates an example computing platform 6000 such as the STAs 1010, 1030, 1090, 1092, 1094, 1096, and 1098 in FIG. 1A. In some examples, as shown in FIG. 6, computing platform 6000 may include a processing component 6010, other platform components or a communications interface 6030 such as the wireless network interfaces 1022 and 1052 shown in FIG. 1A. According to some examples, computing platform 6000 may be a computing device such as a server in a system such as a data center or server farm that supports a manager or controller for managing configurable computing resources as mentioned above. Furthermore, the communications interface 6030 may comprise a wake-up radio (WUR) and may be capable of waking up a primary connectivity radio (PCR) of the computing platform 6000.

According to some examples, processing component 6010 may execute processing operations or logic for apparatus 6015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 6000 may include or exclude functions and/or specific configurations of the computing platform 6000 described herein.

The components and features of computing platform 6000 may comprise any combination of discrete circuitry, ASICs, logic gates and/or single chip architectures. Further, the features of computing platform 6000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Several embodiments have one or more potentially advantages effects. For instance, entering into a WUR mode suspend, advantageously facilitates a low power, low cost wake-up radio and reduced communications due to reduction in negotiation of parameters for the WUR mode. Logic circuitry of a primary connectivity radio (PCR) of the apparatus, to switch from a WUR mode to a WUR mode suspend state by generation of a request frame, the request frame comprising a field with a value to indicate an entry, by the apparatus, into a WUR mode suspend state to pass to a physical layer device for transmission to an access point, the apparatus to maintain WUR mode parameters during the WUR mode suspend state advantageously facilitates a low power, low cost wake-up radio and reduced communications due to reduction in negotiation of parameters for the WUR mode. logic circuitry to communicate with a primary connectivity radio (PCR) of a station, to switch the station from a WUR mode to a WUR mode suspend state by generation of an acknowledgement in response to a request frame, the request frame comprising a field with a value to indicate an entry, by the station, into a WUR mode suspend state, the apparatus to maintain WUR mode parameters during the WUR mode suspend state advantageously facilitates a low power, low cost wake-up radio and wake-up radio packet transmissions as part of OFDMA transmissions to increase spectral utilization advantageously facilitates a low power, low cost wake-up radio and reduced communications due to reduction in negotiation of parameters for the WUR mode.

EXAMPLES OF FURTHER EMBODIMENTS

The following examples pertain to further embodiments. Specifics in the examples may be used anywhere in one or more embodiments.

Example 1 is an apparatus to suspend a wake-up radio (WUR) mode, the apparatus comprising: a memory; and logic circuitry of a primary connectivity radio (PCR) of the apparatus, to switch from a WUR mode to a WUR mode suspend by generation of a request frame, the request frame comprising a field with a value to indicate an entry, by the apparatus, into a WUR mode suspend to pass to a physical layer device for transmission to an access point, the apparatus to maintain WUR mode parameters in the memory during the WUR mode suspend. In Example 2, the apparatus of claim 1, the logic circuitry to communicate an acknowledgment received from the access point in response to transmitting the request frame. In Example 3, the apparatus of claim 1, wherein the logic circuitry is configured to generate a second request frame with a second value to indicate an entry, by the apparatus into the WUR mode. In Example 4, the apparatus of claim 3, the logic circuitry to communicate an acknowledgment received from the access point in response to transmitting the second request frame. In Example 5, the apparatus of claim 3, wherein the logic circuitry is configured to negotiate WUR mode parameters in response to a response frame from the access point. In Example 6, the apparatus of claim 1, during the WUR mode, to suspend the existing negotiated service period between the access point and the apparatus for the PCR. In Example 7, the apparatus of claim 1, during the WUR mode suspend, to resume the existing negotiated service period between the access point and the apparatus for the PCR. In Example 8, the apparatus of claim 1, the logic circuitry to establish a duty cycle with the access point for the WUR circuitry while the apparatus is in the WUR mode. In Example 9, the apparatus of claim 8, the WUR circuitry comprises a WURx awake state and a WURx power save state, the WUR circuitry able to receive a WUR packet in the WURx awake state and not able to receive a WUR packet in the WURx power save state. In Example 10, the apparatus of claim 1, further comprising a processor, a radio coupled with the physical layer device, and one or more antennas coupled with the radio to transmit the frame an orthogonal frequency-division multiple access (OFDMA) modulated signal.

Example 11 is a method to suspend a wake-up radio (WUR) mode, the method comprising: generating, by a logic circuitry of a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend; and storing, by the logic circuitry, the WUR mode parameters in the memory. In Example 12, the method of claim 11, the logic circuitry to communicate an acknowledgment received from the access point in response to transmitting the request frame. In Example 13, the method of claim 11, further comprising generating, by the logic circuitry, a second request frame with a second value to indicate an entry, by the first device into the WUR mode. In Example 14, the method of claim 13, the logic circuitry to communicate an acknowledgment received from the access point in response to transmitting the second request frame. In Example 15, the method of claim 13, further comprising generating, by the logic circuitry, WUR mode parameters in response to a response frame from the access point. In Example 16, the method of claim 11, further comprising suspending, during the WUR mode, the existing negotiated service period between the access point and the first device for the PCR. In Example 17, the method of claim 11, further comprising resuming, during the WUR mode suspend, the existing negotiated service period between the access point and the first device for the PCR. In Example 18, the method of claim 11, establishing, by the logic circuitry, a duty cycle with the access point for the WUR circuitry while the first device is in the WUR mode. In Example 19, the method of claim 17, the WUR circuitry comprises a WURx awake state and a WURx power save state, the WUR circuitry able to receive a WUR packet in the WURx awake state and not able to receive a WUR packet in the WURx power save state.

Example 20 is a system to suspend a wake-up radio (WUR) mode, the apparatus comprising: one or more antennas; a radio coupled with the one or more antennas; a memory; a baseband processor of a primary connectivity radio (PCR) of the system, to switch from a WUR mode to a WUR mode suspend by generation of a request frame, the request frame comprising a field with a value to indicate an entry, by the system, into a WUR mode suspend to pass to a physical layer device for transmission to an access point, the system to maintain WUR mode parameters during the WUR mode suspend; and the physical layer device to cause transmission of the request frame via the radio and the one or more antennas. In Example 21, the system of claim 20, the physical layer device to communicate an acknowledgment received from the access point in response to transmitting the request frame. In Example 22, the system of claim 20, wherein the baseband processor is configured to generate a second request frame with a second value to indicate an entry, by the system into the WUR mode. In Example 23, the system of claim 22, the physical layer device to communicate an acknowledgment received from the access point in response to transmitting the second request frame. In Example 24, the system of claim 22, wherein the baseband processor is configured to negotiate WUR mode parameters in response to a response frame from the access point. In Example 25, the system of claim 20, during the WUR mode, to suspend the existing negotiated service period between the access point and the system for the PCR. In Example 26, the system of claim 20, the during the WUR mode suspend, to resume the existing negotiated service period between the access point and the system for the PCR. In Example 27, the system of claim 20, the baseband processor to establish a duty cycle with the access point for the WUR circuitry while the system is in the WUR mode. In Example 28, the system of claim 27, the WUR circuitry comprises a WURx awake state and a WURx power save state, the WUR circuitry able to receive a WUR packet in the WURx awake state and not able to receive a WUR packet in the WURx power save state. In Example 29, the system of claim 27, the physical layer device coupled with the radio and the radio coupled with the one or more antennas to transmit an orthogonal frequency-division multiple access (OFDMA) modulated signal.

Example 30 is a non-transitory computer-readable medium, comprising instructions to suspend a wake-up radio (WUR) mode, which when executed by a processor, cause the processor to perform operations to: generate, by a logic circuitry of a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend; and cause transmission of the request frame. In Example 31, the non-transitory computer-readable medium of claim 30, further comprising operations to communicate an acknowledgment received from the access point in response to transmitting the request frame. In Example 32, the non-transitory computer-readable medium of claim 31, further comprising operations to generate, by the logic circuitry, a second request frame with a second value to indicate an entry, by the first device into the WUR mode. In Example 33, the non-transitory computer-readable medium of claim 31, further comprising operations to communicate an acknowledgment received from the access point in response to transmitting the second request frame. In Example 34, the non-transitory computer-readable medium of claim 30, further comprising operating to generate, by the logic circuitry, WUR mode parameters in response to a response frame from the access point. In Example 35, the non-transitory computer-readable medium of claim 30, further comprising operations to suspend, during the WUR mode, the existing negotiated service period between the access point and the first device for the PCR. In Example 36, the non-transitory computer-readable medium of claim 30, further comprising operations to resume, during the WUR mode suspend, the existing negotiated service period between the access point and the first device for the PCR. In Example 37, the non-transitory computer-readable medium of claim 30, further comprising operations to establish, by the logic circuitry, a duty cycle with the access point for the WUR circuitry while the first device is in the WUR mode. In Example 38, the non-transitory computer-readable medium of claim 37, the WUR circuitry comprises a WURx awake state and a WURx power save state, the WUR circuitry able to receive a WUR packet in the WURx awake state and not able to receive a WUR packet in the WURx power save state.

Example 39 is an apparatus to suspend a wake-up radio (WUR) mode, the apparatus comprising: a means generating by a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend; and a means for causing transmission of the request frame. In Example 40, the apparatus of claim 39, further comprising a processor, a memory coupled with the processor, a radio coupled with a physical layer device, and one or more antennas coupled with the radio to transmit an orthogonal frequency-division multiple access (OFDMA) modulated signal. In Example 41, the apparatus of claim 39, further comprising a means for communicating an acknowledgment received from the access point in response to transmitting the request frame. In Example 42, the apparatus of claim 39, further comprising a means for generating a second request frame with a second value to indicate an entry, by the first device into the WUR mode. In Example 43, the apparatus of claim 42, further comprising a means for communicating an acknowledgment received from the access point in response to transmitting the second request frame. In Example 44, the apparatus of claim 42, further comprising a means for generating WUR mode parameters in response to a response frame from the access point. In Example 45, the apparatus of claim 39, further comprising a means for suspending, during the WUR mode, the existing negotiated service period between the access point and the first device for the PCR. In Example 46, the apparatus of claim 39, further comprising a means for resuming, during the WUR mode suspend, the existing negotiated service period between the access point and the first device for the PCR. In Example 47, the apparatus of claim 39, further comprising a means for establishing a duty cycle with the access point for the WUR circuitry while the first device is in the WUR mode. In Example 48, the apparatus of claim 47, the WUR circuitry comprises a WURx awake state and a WURx power save state, the WUR circuitry able to receive a WUR packet in the WURx awake state and not able to receive a WUR packet in the WURx power save state.

Example 49 is an apparatus to enter a wake-up radio (WUR) mode suspend state, the apparatus comprising: a memory; and logic circuitry to communicate with a primary connectivity radio (PCR) of a station, to switch the station from a WUR mode to a WUR mode suspend by generation of an acknowledgement in response to a request frame, the request frame comprising a field with a value to indicate an entry, by the station, into a WUR mode suspend, the apparatus to maintain WUR mode parameters during the WUR mode suspend. In Example 50, the apparatus of claim 49, further comprising a processor, a radio coupled with the physical layer device, and one or more antennas coupled with the radio to transmit the acknowledgement as an orthogonal frequency-division multiple access (OFDMA) modulated signal. In Example 51, the apparatus of claim 49, wherein the logic circuitry is configured to generate a second acknowledgement for entry of the station into the WUR mode. In Example 52, the apparatus of claim 49, wherein the logic circuitry is configured to negotiate WUR mode parameters in response to a request frame from the station. In Example 53, the apparatus of claim 49, during the WUR mode, to suspend the existing negotiated service period between the apparatus and the PCR of the station. In Example 54, the apparatus of claim 49, during the WUR mode suspend, to resume the existing negotiated service period between the apparatus and the PCR of the station. In Example 55, the apparatus of claim 49, the logic circuitry to establish a duty cycle with the station for WUR circuitry while the station is in the WUR mode. In Example 56, the apparatus of claim 55, the WUR circuitry comprises a WURx awake state and a WURx power save state, the WUR circuitry able to receive a WUR packet in the WURx awake state and not able to receive a WUR packet in the WURx power save state.

Example 57 is a method to suspend a wake-up radio (WUR) mode, the method comprising: generating, by a logic circuitry of an access point, an acknowledgement, in response to a request frame from a primary connectivity radio (PCR) of a station, to switch the station from a WUR mode to a WUR mode suspend, the request frame comprising a field with a value to indicate an entry, by the station, into a WUR mode suspend, the access point to maintain WUR mode parameters during the WUR mode suspend; and storing, by the logic circuitry, the WUR mode parameters in the memory. In Example 58, the method of claim 57, further comprising generating a second acknowledgement for entry of the station into the WUR mode. In Example 59, the method of claim 57, further comprising negotiating WUR mode parameters in response to a request frame from the station. In Example 60, the method of claim 57, further comprising suspending, during the WUR mode, the existing negotiated service period between the apparatus and the PCR of the station. In Example 61, the method of claim 57, further comprising resuming, during the WUR mode suspend, the existing negotiated service period between the apparatus and the PCR of the station. In Example 62, the method of claim 57, further comprising establishing a duty cycle with the station for WUR circuitry while the station is in the WUR mode. In Example 63, the method of claim 62, wherein the WUR circuitry comprises a WURx awake state and a WURx power save state, the access point able to transmit a WUR packet to the WUR circuitry while the station is in the WURx awake state.

Example 64 is a system to suspend a wake-up radio (WUR) mode, the apparatus comprising: one or more antennas; a radio coupled with the one or more antennas; a memory; a baseband processor to communicate with a primary connectivity radio (PCR) of a station, to switch the station from a WUR mode to a WUR mode suspend by generation of an acknowledgement in response to a request frame, the request frame comprising a field with a value to indicate an entry, by the station, into a WUR mode suspend, the system to maintain WUR mode parameters during the WUR mode suspend; and the physical layer device to cause transmission of the acknowledgement via the radio and the one or more antennas. In Example 65, the system of claim 64, wherein the baseband processor is configured to generate a second acknowledgement for entry of the station into the WUR mode. In Example 66, the system of claim 64, wherein the baseband processor is configured to negotiate WUR mode parameters in response to a request frame from the station. In Example 67, the system of claim 64, during the WUR mode, to suspend the existing negotiated service period between the system and the PCR of the station. In Example 68, the system of claim 64, the during the WUR mode suspend, to resume the existing negotiated service period between the system and the PCR of the station. In Example 69, the system of claim 64, the baseband processor to establish a duty cycle with the station for WUR circuitry while the station is in the WUR mode. In Example 70, the system of claim 69, wherein the WUR circuitry comprises a WURx awake state and a WURx power save state, the access point able to transmit a WUR packet to the WUR circuitry while the station is in the WURx awake state.

Example 71 is a non-transitory computer-readable medium, comprising instructions to suspend a wake-up radio (WUR) mode, which when executed by a processor, cause the processor to perform operations to: generate an acknowledgement by an access point, in response to a request frame from a primary connectivity radio (PCR) of a station, to switch the station from a WUR mode to a WUR mode suspend, the request frame comprising a field with a value to indicate an entry, by the station, into a WUR mode suspend, an access point to maintain WUR mode parameters during the WUR mode suspend; and cause transmission of the acknowledgement. In Example 72, the non-transitory computer-readable medium of claim 71, further comprising operations to generate a second acknowledgement for entry of the station into the WUR mode. In Example 73, the non-transitory computer-readable medium of claim 71, further comprising operations to negotiate WUR mode parameters in response to a request frame from the station. In Example 74, the non-transitory computer-readable medium of claim 71, further comprising operations to suspend, during the WUR mode, the existing negotiated service period between the access point and the PCR of the station. In Example 75, the non-transitory computer-readable medium of claim 71, further comprising operating to resume, during the WUR mode suspend, the existing negotiated service period between the access point and the PCR of the station. In Example 76, the non-transitory computer-readable medium of claim 71, further comprising operations to establish a duty cycle with the station for WUR circuitry while the station is in the WUR mode. In Example 77, the non-transitory computer-readable medium of claim 76, wherein the WUR circuitry comprises a WURx awake state and a WURx power save state, the access point able to transmit a WUR packet to the WUR circuitry while the station is in the WURx awake state.

Example 78 is an apparatus to suspend a wake-up radio (WUR) mode, the apparatus comprising: a means generating, by an access point, an acknowledgement, in response to a request frame from a primary connectivity radio (PCR) of a station, to switch the station from a WUR mode to a WUR mode suspend, the request frame comprising a field with a value to indicate an entry, by the station, into a WUR mode suspend, the access point to maintain WUR mode parameters during the WUR mode suspend; and a means for causing transmission of the acknowledgement. In Example 79, the apparatus of claim 78, further comprising a processor, a memory coupled with the processor, a radio coupled with a physical layer device, and one or more antennas coupled with the radio to transmit an orthogonal frequency-division multiple access (OFDMA) modulated signal. In Example 80, the apparatus of claim 78, further comprising a means for generating a second acknowledgement for entry of the station into the WUR mode. In Example 81, the apparatus of claim 78, further comprising a means for negotiating WUR mode parameters in response to a request frame from the station. In Example 82, the apparatus of claim 78, further comprising a means for suspending, during the WUR mode, the existing negotiated service period between the apparatus and the PCR of the station. In Example 83, the apparatus of claim 78, further comprising a means for resuming, during the WUR mode suspend, the existing negotiated service period between the apparatus and the PCR of the station. In Example 84, the apparatus of claim 79, further comprising a means for establishing a duty cycle with the station for WUR circuitry while the station is in the WUR mode. In Example 85, the apparatus of claim 84, wherein the WUR circuitry comprises a WURx awake state and a WURx power save state, the access point able to transmit a WUR packet to the WUR circuitry while the station is in the WURx awake state.

What is claimed is:

1. An apparatus to suspend a wake-up radio (WUR) mode, the apparatus comprising:
   a memory; and
   logic circuitry of a primary connectivity radio (PCR) of the apparatus, to switch from a WUR mode to a WUR mode suspend by generation of a request frame, the request frame comprising a field with a value to indicate an entry, by the apparatus, into a WUR mode suspend to pass to a physical layer device for transmission to an access point, the apparatus to maintain WUR mode parameters in the memory during the WUR mode suspend, wherein the logic circuitry is configured to generate a second request frame with a second value to indicate an entry, by the apparatus into the WUR mode.

2. The apparatus of claim 1, the logic circuitry to communicate an acknowledgment received from the access point in response to transmitting the request frame.

3. The apparatus of claim 1, further comprising a processor, a radio coupled with the physical layer device, and one or more antennas coupled with the radio to transmit the frame as an orthogonal frequency-division multiple access (OFDMA) modulated signal.

4. The apparatus of claim 1, the logic circuitry to communicate an acknowledgment received from the access point in response to transmitting the second request frame.

5. The apparatus of claim 1, wherein the logic circuitry is configured to negotiate WUR mode parameters in response to a response frame from the access point.

6. The apparatus of claim 1, during the WUR mode, to suspend an existing negotiated service period between the access point and the apparatus for the PCR.

7. The apparatus of claim 6, during the WUR mode suspend, to resume the existing negotiated service period between the access point and the apparatus for the PCR.

8. The apparatus of claim 1, the logic circuitry to establish a duty cycle with the access point for WUR circuitry while the apparatus is in the WUR mode.

9. The apparatus of claim 8, the WUR circuitry comprises a WURx awake state and a WURx power save state, the WUR circuitry able to receive a WUR packet in the WURx awake state and not able to receive a WUR packet in the WURx power save state.

10. A non-transitory computer-readable medium, comprising instructions to suspend a wake-up radio (WUR) mode, which when executed by a processor, cause the processor to perform operations to:
    generate, by a logic circuitry of a primary connectivity radio (PCR) of a first device, a request frame to switch from a WUR mode to a WUR mode suspend, the request frame comprising a field with a value to indicate an entry, by the first device, into a WUR mode suspend to pass to a physical layer device for transmission to an access point, the first device to maintain WUR mode parameters during the WUR mode suspend;
    cause transmission of the request frame; and
    generate a second request frame with a second value to indicate an entry, by the first device into the WUR mode.

11. The non-transitory computer-readable medium of claim 10, further comprising operations to establish, by the logic circuitry, a duty cycle with the access point for WUR circuitry while the first device is in the WUR mode.

12. The non-transitory computer-readable medium of claim 11, the WUR circuitry comprises a WURx awake state and a WURx power save state, the WUR circuitry able to receive a WUR packet in the WURx awake state and not able to receive a WUR packet in the WURx power save state.

13. The non-transitory computer-readable medium of claim 10, further comprising operations to communicate an acknowledgment received from the access point in response to transmitting the request frame.

14. The non-transitory computer-readable medium of claim 10, further comprising operations to communicate an acknowledgment received from the access point in response to transmitting the second request frame.

15. The non-transitory computer-readable medium of claim 10, further comprising operating to negotiate, by the logic circuitry, WUR mode parameters in response to a response frame from the access point.

16. The non-transitory computer-readable medium of claim 10, further comprising operations to suspend, during the WUR mode, an existing negotiated service period between the access point and the first device for the PCR.

17. The non-transitory computer-readable medium of claim 16, further comprising operations to resume, during the WUR mode suspend, the existing negotiated service period between the access point and the first device for the PCR.

18. An apparatus to enter a wake-up radio (WUR) mode suspend state, the apparatus comprising:
    a memory; and
    logic circuitry to communicate with a primary connectivity radio (PCR) of a station, to switch the station from a WUR mode to a WUR mode suspend by generation of an acknowledgement in response to a request frame, the request frame comprising a field with a value to indicate an entry, by the station, into a WUR mode suspend, the apparatus to maintain WUR mode parameters in the memory during the WUR mode suspend; wherein the logic circuitry is configured to generate a second acknowledgement for entry of the station into the WUR mode.

19. The apparatus of claim 18, the logic circuitry to establish a duty cycle with the station for WUR circuitry while the station is in the WUR mode.

20. The apparatus of claim 19, the WUR circuitry comprises a WURx awake state and a WURx power save state, the WUR circuitry able to receive a WUR packet in the WURx awake state and not able to receive a WUR packet in the WURx power save state.

21. The apparatus of claim 18, further comprising a processor, a radio coupled with a physical layer device, and one or more antennas coupled with the radio to transmit the acknowledgement as an orthogonal frequency-division multiple access (OFDMA) modulated signal.

22. The apparatus of claim 18, wherein the logic circuitry is configured to negotiate WUR mode parameters in response to a request frame from the station.

23. The apparatus of claim 18, during the WUR mode, to suspend an existing negotiated service period between the apparatus and the PCR of the station.

24. The apparatus of claim 23, during the WUR mode suspend, to resume the existing negotiated service period between the apparatus and the PCR of the station.

25. A non-transitory computer-readable medium, comprising instructions to suspend a wake-up radio (WUR) mode, which when executed by a processor, cause the processor to perform operations to:

generate an acknowledgement, in response to a request frame from a primary connectivity radio (PCR) of a station, to switch the station from a WUR mode to a WUR mode suspend, the request frame comprising a field with a value to indicate an entry, by the station, into a WUR mode suspend, an access point to maintain WUR mode parameters during the WUR mode suspend;

cause transmission of the acknowledgement; and generate a second acknowledgement for entry of the station into the WUR mode.

26. The non-transitory computer-readable medium of claim 25, further comprising operations to suspend, during the WUR mode, the existing negotiated service period between the access point and the PCR of the station.

27. The non-transitory computer-readable medium of claim 25, further comprising operating to resume, during the WUR mode suspend, an existing negotiated service period between the access point and the PCR of the station.

28. The non-transitory computer-readable medium of claim 27, further comprising operations to establish a duty cycle with the station for WUR circuitry while the station is in the WUR mode.

29. The non-transitory computer-readable medium of claim 28, the WUR circuitry comprises a WURx awake state and a WURx power save state, the access point able to transmit a WUR packet to the WUR circuitry while the station is in the WURx awake state.

30. The non-transitory computer-readable medium of claim 25, further comprising operations to negotiate WUR mode parameters in response to a request frame from the station.

* * * * *